(12) United States Patent
Choi

(10) Patent No.: US 12,093,053 B2
(45) Date of Patent: Sep. 17, 2024

(54) MOBILE ROBOT AND CONTROL METHOD THEREOF

(71) Applicant: LG ELECTRONICS INC., Seoul (KR)

(72) Inventor: Jieun Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 208 days.

(21) Appl. No.: 16/929,423

(22) Filed: Jul. 15, 2020

(65) Prior Publication Data

US 2021/0018929 A1 Jan. 21, 2021

(30) Foreign Application Priority Data

Jul. 16, 2019 (KR) .................. 10-2019-0085477

(51) Int. Cl.
*G05D 1/00* (2024.01)
*G01C 21/20* (2006.01)

(52) U.S. Cl.
CPC ......... *G05D 1/0246* (2013.01); *G05D 1/0212* (2013.01); *G01C 21/206* (2013.01)

(58) Field of Classification Search
CPC .... G01C 21/206; G05D 1/0212; G05D 1/024; G05D 1/0246; G05D 1/0274; G05D 2201/0203
See application file for complete search history.

(56) References Cited

U.S. PATENT DOCUMENTS

| | | |
|---|---|---|
| 5,677,836 A | 10/1997 | Bauer |
| 5,684,695 A | 11/1997 | Bauer |
| 5,793,934 A | 8/1998 | Bauer |
| 8,676,429 B2 | 3/2014 | Nakano et al. |
| 11,175,670 B2 | 11/2021 | Artes et al. |
| 11,288,836 B2 | 3/2022 | Park et al. |

(Continued)

FOREIGN PATENT DOCUMENTS

| | | |
|---|---|---|
| JP | H06-327599 | 11/1994 |
| JP | 2010-225125 | 10/2010 |

(Continued)

OTHER PUBLICATIONS

Korean Notice of Allowance dated May 29, 2021 issued in KR Application No. 10-2019-0083998.

(Continued)

*Primary Examiner* — Matthew J. Reda

(74) *Attorney, Agent, or Firm* — KED & ASSOCIATES, LLP

(57) ABSTRACT

Provided is a mobile robot including a traveling unit configured to move a main body, a light detection and ranging (LiDAR) sensor configured to acquire external geometry information of the main body, and a controller configured to create node data based on LiDAR data sensed by the LiDAR sensor, to create grid map based on the LiDAR data and the node data, to create first map data based on the node data, to update the grid map based on the first map data, and to image-process the updated grid map to create second map data, where a map may be quickly and safely created without an environmental restriction, by effectively combining a node-based map creating method and a grid-based map creating method.

16 Claims, 24 Drawing Sheets

(56) References Cited

U.S. PATENT DOCUMENTS

| | | | |
|---|---|---|---|
| 11,399,687 B2 | 8/2022 | Cheong | |
| 2002/0015521 A1 | 2/2002 | Kim | |
| 2003/0030398 A1 | 2/2003 | Jacobs et al. | |
| 2004/0039498 A1* | 2/2004 | Ollis | G05D 1/0257 701/23 |
| 2004/0204792 A1 | 10/2004 | Taylor et al. | |
| 2005/0000543 A1 | 1/2005 | Taylor et al. | |
| 2005/0010331 A1 | 1/2005 | Taylor et al. | |
| 2005/0273967 A1 | 12/2005 | Taylor et al. | |
| 2006/0020369 A1 | 1/2006 | Taylor et al. | |
| 2007/0061043 A1 | 3/2007 | Ermakov et al. | |
| 2008/0273791 A1* | 11/2008 | Lee | G05D 1/0274 382/173 |
| 2009/0281661 A1 | 11/2009 | Dooley et al. | |
| 2010/0070078 A1* | 3/2010 | Kong | G05D 1/0274 901/1 |
| 2010/0324731 A1 | 12/2010 | Letsky | |
| 2010/0328457 A1 | 12/2010 | Lee | |
| 2011/0098874 A1 | 4/2011 | Choi et al. | |
| 2011/0137461 A1* | 6/2011 | Kong | G05D 1/0274 901/1 |
| 2011/0167574 A1* | 7/2011 | Stout | G05D 1/0234 701/25 |
| 2012/0106829 A1 | 5/2012 | Lee et al. | |
| 2012/0143372 A1* | 6/2012 | Roh | G05D 1/0217 901/1 |
| 2013/0138247 A1 | 5/2013 | Gutmann et al. | |
| 2014/0009748 A1 | 1/2014 | Leonessa et al. | |
| 2014/0142891 A1* | 5/2014 | Lucidarme | G05D 1/024 702/159 |
| 2015/0242806 A1 | 8/2015 | Cousins et al. | |
| 2016/0005229 A1* | 1/2016 | Lee | G06T 11/60 345/419 |
| 2016/0069691 A1* | 3/2016 | Fong | G05D 1/0088 701/447 |
| 2016/0132056 A1 | 5/2016 | Yoshino | |
| 2016/0167226 A1 | 6/2016 | Schnittman | |
| 2016/0302638 A1 | 10/2016 | Haegermarck | |
| 2017/0028556 A1* | 2/2017 | Summer | B25J 9/1664 |
| 2017/0131721 A1 | 5/2017 | Kwak et al. | |
| 2017/0239813 A1 | 8/2017 | Vicenti | |
| 2018/0177361 A1 | 6/2018 | Song et al. | |
| 2018/0239355 A1 | 8/2018 | Lee et al. | |
| 2018/0267552 A1 | 9/2018 | Artes et al. | |
| 2018/0289228 A1 | 10/2018 | Xue et al. | |
| 2018/0290748 A1* | 10/2018 | Corban | G02B 27/017 |
| 2018/0296049 A1 | 10/2018 | Izawa et al. | |
| 2018/0306587 A1 | 10/2018 | Holz | |
| 2018/0314254 A1 | 11/2018 | Bauer et al. | |
| 2018/0361583 A1 | 12/2018 | Williams et al. | |
| 2019/0011929 A1 | 1/2019 | Maeno | |
| 2019/0025838 A1 | 1/2019 | Artes et al. | |
| 2019/0035100 A1 | 1/2019 | Ebrahimi Afrouzi et al. | |
| 2019/0061157 A1 | 2/2019 | Suvarna et al. | |
| 2019/0086539 A1 | 3/2019 | Lee et al. | |
| 2019/0090712 A1 | 3/2019 | Cheong | |
| 2019/0094869 A1 | 3/2019 | Artes et al. | |
| 2019/0094870 A1 | 3/2019 | Afrouzi et al. | |
| 2019/0113927 A1* | 4/2019 | England | G05D 1/0221 |
| 2019/0220020 A1 | 7/2019 | Macias et al. | |
| 2019/0301873 A1* | 10/2019 | Prasser | G01C 21/3848 |
| 2019/0310653 A1 | 10/2019 | Lee et al. | |
| 2019/0332121 A1 | 10/2019 | Kim et al. | |
| 2019/0339703 A1* | 11/2019 | Bao | G05D 1/0221 |
| 2020/0393545 A1 | 12/2020 | Shani et al. | |
| 2021/0048312 A1 | 2/2021 | Choi et al. | |
| 2022/0137637 A1 | 5/2022 | Baldini et al. | |

FOREIGN PATENT DOCUMENTS

| | | |
|---|---|---|
| JP | 2012-011200 | 1/2012 |
| JP | 2014-123200 | 7/2014 |
| JP | 2017-083663 | 5/2017 |
| JP | 2019-505256 | 2/2019 |
| KR | 10-0611328 | 8/2006 |
| KR | 10-0715609 | 5/2007 |
| KR | 10-0791384 | 1/2008 |
| KR | 10-2010-0031878 | 3/2010 |
| KR | 10-2010-0070582 | 6/2010 |
| KR | 10-2011-0000848 | 1/2011 |
| KR | 10-2012-0047137 | 5/2012 |
| KR | 10-1179075 | 9/2012 |
| KR | 10-1242252 | 3/2013 |
| KR | 10-2013-0112507 | 10/2013 |
| KR | 10-2014-0009737 | 1/2014 |
| KR | 10-1427186 | 8/2014 |
| KR | 10-1553654 | 10/2015 |
| KR | 10-2016-0036008 | 4/2016 |
| KR | 10-2018-0074537 | 7/2018 |
| KR | 10-2018-0082264 | 7/2018 |
| KR | 10-2019-0103511 | 9/2019 |
| WO | WO 2017/173553 | 10/2017 |
| WO | WO 2018/043180 | 3/2018 |
| WO | WO 2019/080679 | 5/2019 |

OTHER PUBLICATIONS

International Search Report dated Jan. 8, 2021 issued in International Application No. PCT/KR2020/009048.
International Search Report dated Oct. 30, 2020 issued in International Application No. PCT/KR2020/008724.
International Search Report dated Dec. 23, 2020 issued in International Application No. PCT/KR2020/009343.
International Search Report dated Dec. 23, 2020 issued in International Application No. PCT/KR2020/008715.
United States Office Action dated Jul. 15, 2022 issued in co-pending related U.S. Appl. No. 16/920,082.
United States Office Action dated Jul. 15, 2022 issued in co-pending related U.S. Appl. No. 16/921,167.
United States Office Action dated Sep. 1, 2022 issued in co-pending related U.S. Appl. No. 16/925,798.
United States Office Action dated Sep. 2, 2022 issued in co-pending related U.S. Appl. No. 16/924,848.
U.S. Appl. No. 16/920,082, filed Jul. 2, 2020.
U.S. Appl. No. 16/921,167, filed Jul. 6, 2020.
U.S. Appl. No. 16/925,798, filed Jul. 10, 2020.
U.S. Appl. No. 16/924,848, filed Jul. 9, 2020.
U.S. Appl. No. 16/929,423, filed Jul. 15, 2020.
Extended European Search Report dated Apr. 18, 2023 issued in Application No. 20837393.6.
Extended European Search Report dated Jul. 20, 2023 issued in Application No. 20836675.7.
Kuipers B et al: "A Robot Exploration and Mapping Strategy Based on a Semantic Hierarchy of Spatial Representations", Robotics and Autonomous Systems, Elsevier BV, Amsterdam, NL, vol. 8, No. 1 / 02, Nov. 1, 1991 (Nov. 1, 1991), pp. 47-63, XP000243465.
Extended European Search Report dated May 26, 2023 issued in Application No. 20839883.4.
Wang Nan et al: "A hybrid map representation for simultaneous localization and mapping of the internal ruins environment", 2013 IEEE International Conference on Information and Automation (ICIA), IEEE, Aug. 26, 2013 (Aug. 26, 2013), pp. 1060-1065, XP032558883.
European Search Report dated Apr. 5, 2024, issued in Application No. 20839883.4.
Alnounou Y. et al.: "Occupancy Grid Map Merging using Feature Maps", IASTED Technology Conferences/ 705: ARP/706: RA/707: NANA/728: CompBIO, Jan. 1, 2010 (Jan. 1, 2010), pp. 1-9.

* cited by examiner

MOBILE ROBOT AND CONTROL METHOD THEREOF

CROSS-REFERENCE TO RELATED APPLICATION

This application claims priority under 35 U.S.C. § 119 to Korean Application No. 10-2019-0085477 filed on Jul. 16, 2019, whose entire disclosure is hereby incorporated by reference. This application is also related to application Ser. No. 16/920,082, filed Jul. 2, 2020, application Ser. No. 16/921,167, filed Jul. 6, 2020, application Ser. No. 16/925,798, filed Jul. 10, 2020, and application Ser. No. 16/924,848, filed Jul. 9, 2020, whose entire disclosures are also hereby incorporated by reference.

BACKGROUND

1. Field

The present disclosure relates to a mobile robot and a control method thereof, and more particularly, to a technique in which a mobile robot automatically generates a map.

2. Background

Robots have been developed for industrial use and have been in charge of part of factory automation. In recent years, robot-applied fields have further expanded to develop medical robots, aerospace robots, and the like, and home robots that may be used in general homes have also been made. Among these robots, a robot capable of traveling by itself is called a mobile robot. A typical example of a mobile robot used at home is a robot vacuum cleaner, which is a machine that cleans a certain region by intaking dust or foreign matter, while traveling in the corresponding region by itself.

The mobile robot, which can be movable by itself, moves freely and has a plurality of sensors for avoiding obstacles and the like during traveling, and thus it is possible to travel by avoiding obstacles. In order to perform a predetermined operation such as cleaning, it is necessary to accurately generate a map of a traveling zone and to accurately recognize a current location of the mobile robot on the map to move to a certain location in the traveling zone.

To recognize a current location of the mobile robot, various methods of continuously recognizing the current location based on traveling information (information on a movement direction and a movement speed or comparison between continuously captured bottom images, etc.) at an immediately previous location during a continuous movement of the mobile robot, etc. Have been studied. In addition, research into various methods for a mobile robot to generate and learn a map on its own has been conducted.

For example, Related Art 1 (Korean Patent Laid-open Publication No. 10-2010-0070582) discloses a technique of creating a topological map by creating an initial map through a distance sensor that detects distance information of a surrounding environment and setting nodes through processing of pixels of the initial map.

For example, Related Art 2 (Korean Patent Laid-open Publication No. 10-2010-0031878) discloses a technique in which a mobile robot generates a path based on uncertainty of locations of feature points extracted from images acquired when searching an unknown environment and traveling along the generated path. The path based on the uncertainty of the feature points is created to increase accuracy of a feature point map of the mobile robot or to increase accuracy of self-location recognition.

However, in the related arts such as Related Art 1, since a topological map is created by creating the initial map overall simply based on distance information acquired during movement and determining nodes based on the generated initial map, an overall connection relationship between the nodes is somewhat inaccurate. In addition, it is difficult to accurately classify and handle a dynamic obstacle which is temporarily located and a fixed obstacle when acquiring distance information and it is difficult to accurately acquire information on points where movement paths intersect.

In the related arts such as Related Art 2, a search path is created by extracting feature points, and here, uncertainty of a specific environment with few features may be high regardless of whether or not the corresponding region is searched, leading to a problem that the same region is continuously searched. In addition, in the case of search traveling using an existing grid map, there is a problem in that a boundary between an empty region searched using points with high uncertainty as feature points and an unsearched region cannot be accurately extracted.

In addition, in the case of creating a map only with information on nodes, a map for a specific type of environment cannot be generated due to direction limitation. In addition, in the case of creating a map only with information on a cell, a mobile robot may not move to the center of a search environment, causing a high possibility of a collision and inefficient path repetition.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Figure 1A:
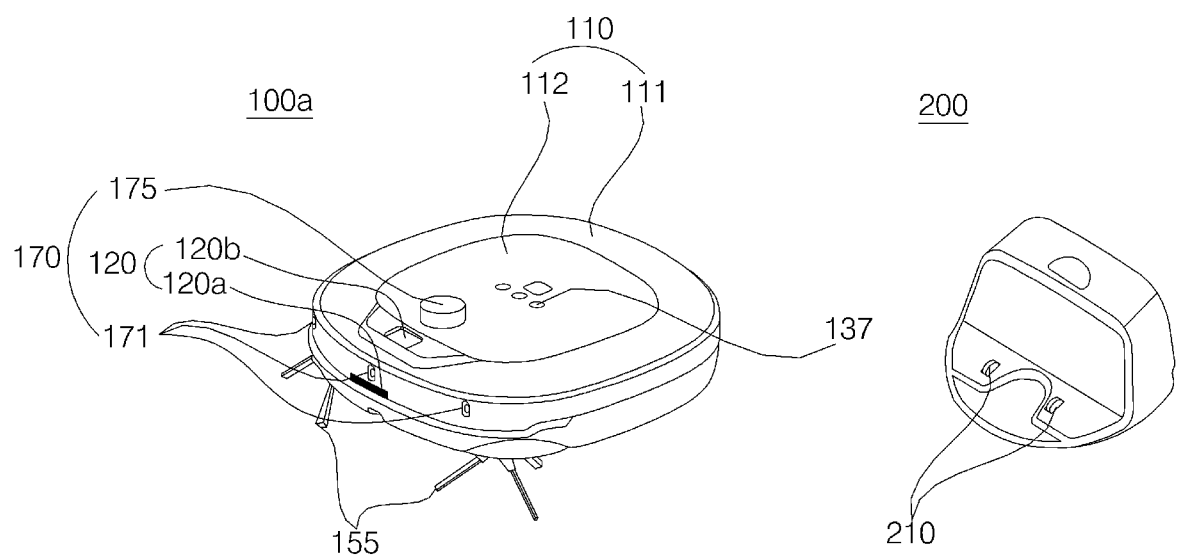
FIGS. 1A to 1D are views illustrating appearances of a moving robot and a charging stand that charges a mobile robot according to an embodiment of the present disclosure.
Figure 1B:
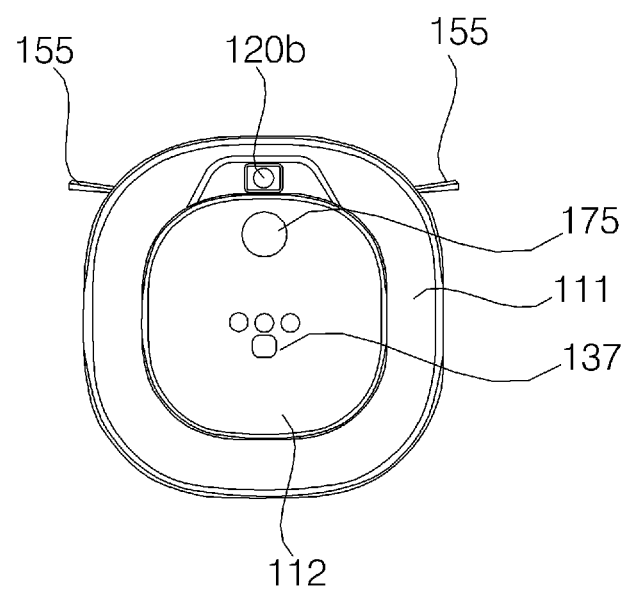
Figure 1C:
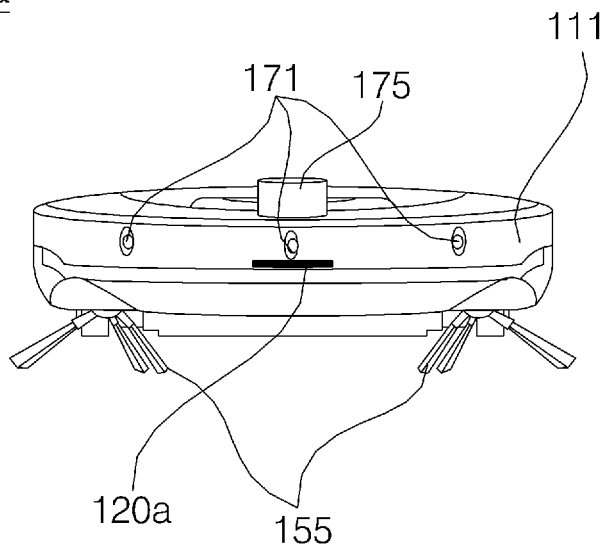
Figure 1D:
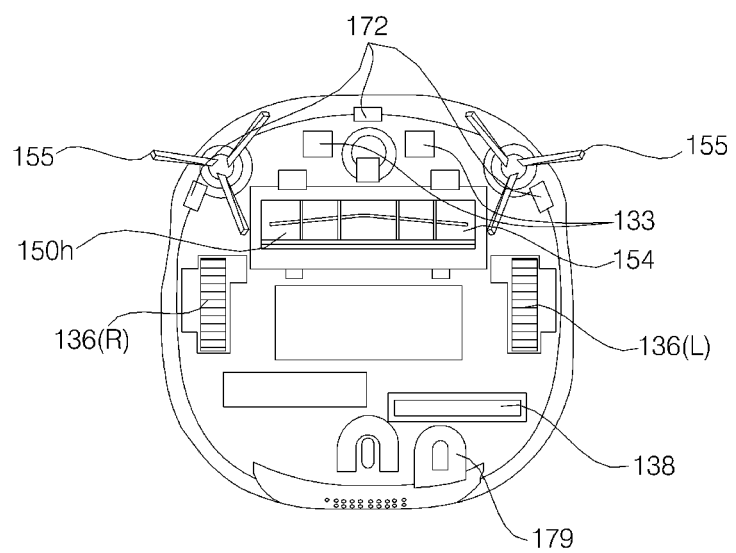

FIGS. 1A to 1D are views illustrating external appearances of a mobile robot and a charging stand that charges a mobile robot according to an embodiment of the present disclosure. FIG. 1A is a perspective view showing a mobile robot and a charging stand that charges a mobile robot according to an embodiment of the present disclosure. FIG. 1B is a view showing an upper portion of the mobile robot shown in FIG. 1A, FIG. 1C is a view showing a front portion of the mobile robot shown in FIG. 1A, and FIG. 1D is a view showing a bottom portion of the mobile robot shown in FIG. 1A.

Referring to FIGS. 1A to 1D, the mobile robot 100 may include, for example, at least one driving wheel 136 that moves a main body 110. The driving wheel 136 may be driven and rotated by, for example, at least one motor (not shown) connected to the driving wheel 136. The driving wheels 136 may be provided on the left and right of the main body 110, respectively, and referred to as a left wheel 136(L) and a right wheel 136(R), respectively, hereinafter.

The left wheel 136(L) and the right wheel 136(R) may be driven by one driving motor, but if necessary, a left-wheel driving motor for driving the left wheel 136(L) and a right-wheel driving motor for driving the right wheel 136(R) may be provided, separately. A traveling direction of the main body 110 may be switched to the left or right by making a difference in rotational speeds of the left wheel 136(L) and the right wheel 136(R).

The mobile robot 100 may include, for example, an intake unit 330 for intaking foreign matter, brushes 154 and 155 for performing brushing, a dust bin for storing collected foreign matter, a mop unit for performing mopping, and the like. For example, an intake port 150h in which air is intaken may be provided on a bottom surface of the main body 110, and an intaking device providing a suction force to allow air to be intaken through the intake port 150h and a dust bin collecting dust intaken together with air through the intake port 150h may be provided in the main body 110.

The mobile robot 100 may include, for example, a case 111 forming a space in which various components configuring the mobile robot 100 are accommodated. An opening (not shown) for insertion and removal of the dust bin may be provided in the case 111, and a dust bin cover 112 that opens and closes the opening may be provided to be rotatable with respect to the case 111.

The mobile robot 100 may include, for example, a roll-type main brush 154 having brushes exposed through the intake port 150h and an auxiliary brush 155 located on a front side of the bottom surface of the main body 110 and having a brush including a plurality of radially extended wings. Dust is separated from a floor in a traveling zone by rotation of these brushes 154 and 155, and the dust separated from the floor may be intaken through the intake port 150h and introduced into the dust bin through the intake unit 330.

Air and dust may be separated from each other, while passing through a filter or a cyclone of the dust bin, and the separated dust may be collected in the dust bin and air may be discharged from the dust bin, may pass through an exhaust flow path (not shown) in the main body 110, and may finally be discharged to the outside through an exhaust port (not shown).

The battery 138 may supply, for example, power required for the overall operation of the mobile robot 100 as well as the driving motor. Meanwhile, when the battery 138 is discharged, the mobile robot 100 may perform traveling to return to a charging stand 200 for charging. During such return traveling, the mobile robot 100 itself may detect a location of the charging stand 200.

The charging stand 200 may include, for example, a signal transmission unit (not shown) that transmits a predetermined return signal. The return signal may be, for example, an ultrasonic signal or an infrared signal, but is not limited thereto.

The mobile robot 100 may include, for example, a signal detection unit (not shown) that receives the return signal. For example, the signal detection unit may include an infrared sensor that detects an infrared signal and may receive an infrared signal transmitted from a signal transmission unit of the charging stand 200. Here, the mobile robot 100 may move to the location of the charging stand 200 according to the infrared signal transmitted from the charging stand 200 and dock with the charging stand 200. A charging terminal 133 of the mobile robot 100 and a charging terminal 210 of the charging stand 200 may be brought into contact with each other by the docking and the battery 138 may be charged.

The mobile robot 100 may include a component that detects information inside/outside the mobile robot 100, for example. The mobile robot 100 may include, for example, a camera 120 that acquires image information on a traveling zone. For example, the mobile robot 100 may include a front camera 120a provided to acquire an image of a front of the main body 110. For example, the mobile robot 100 may include an upper camera 120b provided on an upper surface portion of the main body 110 and acquire an image of a ceiling in the traveling zone. For example, the mobile robot 100 may further include with a lower camera 179 provided on the bottom surface of the main body 110 and acquiring an image of the floor.

Meanwhile, the number of the cameras 120 provided in the mobile robot 100, the location at which the cameras 120 are disposed, and an image capture range are not necessarily limited, and the cameras 120 may be arranged at various locations to acquire image information on the traveling zone. For example, the mobile robot 100 may include a camera (not shown) disposed to be inclined with respect to one surface of the main body 110 and configured to photograph a front side and an upper side together. For example, the mobile robot 100 may include a plurality of front cameras 120a and/or upper cameras 120b or may include a plurality of cameras configured to photograph the front side and the upper side together.

According to various embodiments of the present disclosure, the camera 120 may be installed on a part (e.g., front, rear, and bottom) of the mobile robot 100 and continuously acquire images during traveling or cleaning. For image capture efficiency, a plurality of cameras 120 may be installed for each part, and an image captured by the camera 120 may be used to recognize materials such as dust, hair, or a floor existing in a corresponding space, determine whether cleaning is to be performed, or check a cleaning time.

The mobile robot 100 may include, for example, a light detection and ranging (LiDAR) sensor 175 that acquires external geometry information of the main body 110 using a laser. The LiDAR sensor 175 may output, for example, a laser and receive a laser reflected from an object, thereby acquiring information such as a distance to the object that reflects the laser, a location direction, a material, and the like of the object and acquiring geometry information of the traveling zone. The mobile robot 100 may acquire, for example, 360-degree geometry information based on the information acquired through the LiDAR sensor 175.

The mobile robot 100 may include, for example, sensors 171, 172, and 179 that sense various data related to the operation and state of the mobile robot 100. For example, the mobile robot 100 may include an obstacle detection sensor 171 that detects an obstacle on the front, a cliff detection sensor 172 that detects the presence of a cliff on the floor in the traveling zone, and the like.

The mobile robot 100 may include, for example, an operation unit 137 for inputting various commands such as power on/off of the mobile robot 100, and various control commands required for overall operation of the mobile robot 100 may be received through the operation unit 137. The mobile robot 100 may include, for example, an output unit (not shown), and display reservation information, a battery status, an operation mode, an operation status, an error status, and the like.

Figure 2:
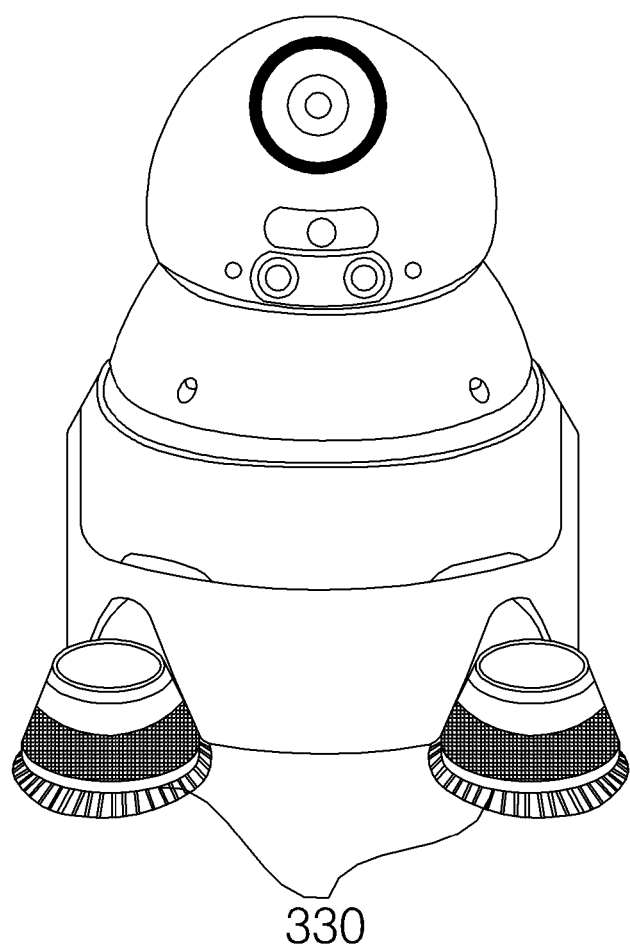
FIG. 2 is a view illustrating an example of a mobile robot according to another embodiment of the present disclosure.

FIG. 2 is a view illustrating an example of a mobile robot according to another embodiment of the present disclosure. FIG. 2 is a view illustrating an example of a mobile robot 100 according to another embodiment of the present disclosure. The mobile robot 100 illustrated in FIG. 2 may include components which are the same as or similar to the mobile robot 100 illustrated in FIGS. 1A to 1D, and thus detailed descriptions thereof will be omitted.

Figure 3:
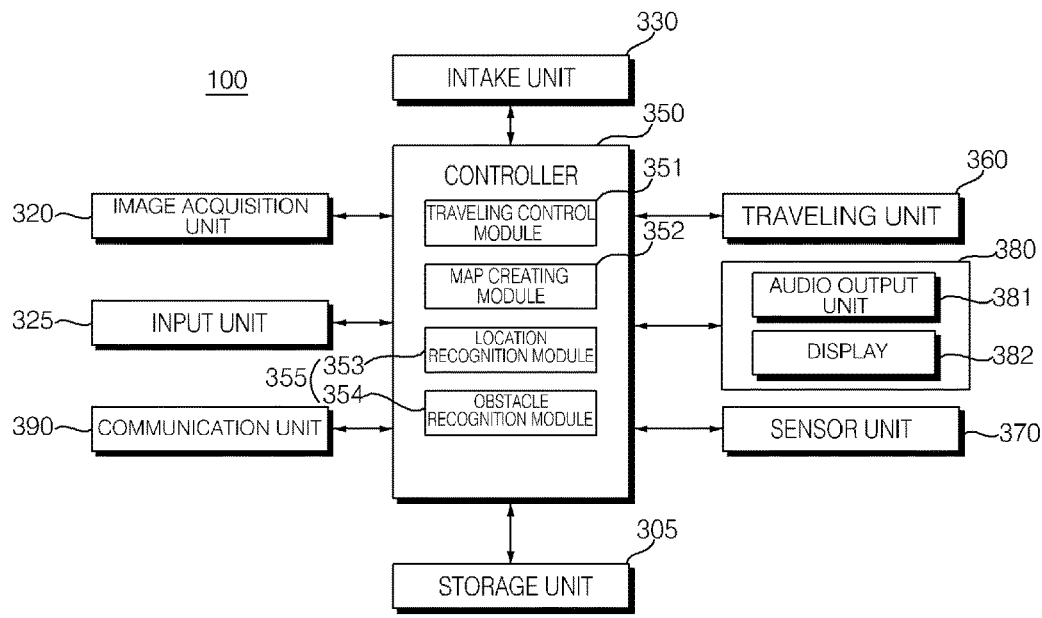
FIG. 3 is a block diagram showing a control relationship between main components of a mobile robot according to an embodiment of the present disclosure.

FIG. 3 is a block diagram showing a control relationship between main components of a mobile robot according to an embodiment of the present disclosure. Referring to FIG. 3, the mobile robot 100 may include, for example, a storage unit 305, an image acquisition unit 320, an input unit 325, the intake unit 330, a controller 350, and a traveling unit 360, a sensor unit 170, 370, an output unit 380, and/or a communication unit 390.

The storage unit 305 may store, for example, various information necessary for the control of the mobile robot 100. The storage unit 305 may include, for example, a volatile or nonvolatile recording medium. The recording medium, which stores data that may be read by a microprocessor, is not limited in type or implementation method.

The storage unit 305 may store, for example, a map for the traveling zone. The map stored in the storage unit 305 may be, for example, input from an external terminal, a server, or the like capable of exchanging information with the mobile robot 100 through wired or wireless communication or may be created by the mobile robot 100 itself through learning.

The storage unit 305 may store data for a node, for example. Here, the node may refer to, for example, a point on the traveling zone. Data for the node may include, for example, coordinates on the traveling zone for the node, information on a plurality of movement directions at the node, information on a relationship with another node, and the like.

For example, locations of rooms in the traveling zone may be indicated on the map. In addition, a current location of the mobile robot 100 may be indicated on the map, and the current location of the mobile robot 100 on the map may be updated during a traveling process. An external terminal may store the same map as the map stored in the storage unit 305.

The storage unit 305 may store, for example, cleaning history information. Such cleaning history information may be created each time cleaning is performed. The storage unit 305 may store, for example, node-based first map data and grid-based second map data.

The map for a traveling zone stored in the storage unit 305 may be, for example, a navigation map used for traveling during cleaning, and a simultaneous localization and mapping (SLAM) used for location recognition, a learning map used during learning cleaning by storing corresponding information in the case of a collision with an obstacle or the like, a global topological map used for used for recognizing a global location, a cell data-based grid map, an obstacle recognition map in which information regarding a recognized obstacle is recorded, and the like.

Meanwhile, as described above, maps may be separately stored and managed in the storage unit 305 for each use, but the maps may not be clearly classified for each use. For example, a plurality of pieces of information may be stored in one map for use in at least two or more purposes.

The image acquisition unit 320 may acquire, for example, an image around the mobile robot 100. The image acquisition unit 320 may include, for example, at least one camera (e.g., the camera 120 of FIG. 1A). Hereinafter, an image acquired through the image acquisition unit 320 may be referred to as an "acquisition image".

The image acquisition unit 320 may include, for example, a digital camera. The digital camera may include an image sensor (e.g., a CMOS image sensor) including at least one optical lens and a plurality of photodiodes (e.g., pixels) on which an image is formed by light passing through the optical lens and a digital signal processor (DSP) that configures an image based on a signal output from the photodiodes. The DSP may create, for example, a still image as well as a moving image composed of frames including still images.

The image acquisition unit 320 may photograph, for example, a situation of an obstacle existing on the front of a traveling direction of the mobile robot 100 or a cleaning region. According to an embodiment of the present disclosure, the image acquisition unit 320 may acquire a plurality of images by continuously photographing the surroundings of the main body 110, and the plurality of acquired images may be stored in the storage unit 305.

The mobile robot 100 may increase accuracy of obstacle recognition by using, for example, a plurality of images or increase the accuracy of obstacle recognition by using effective data by selecting one or more of the plurality of images.

The input unit 325 may include, for example, an input device (e.g., a key, a touch panel, etc.) capable of receiving a user input. For example, the input unit 325 may include an operation unit 137 capable of inputting various commands such as power on/off of the mobile robot 100. The input unit 325 may receive a user input through, for example, the input device and transmit a command corresponding to the received user input to the controller 350.

The intake unit 330 may intake, for example, air containing dust. The intake unit 330 may include, for example, an intake device (not shown) that intakes foreign matter, brushes 154 and 155 that perform brushing, a dust bin (not shown) storing foreign matter collected by the intake device or the brushes (e.g., brushes 154 and 155 of FIG. 1C), an intake port (e.g., intake port 150h of FIG. 1D) intaking air.

The traveling unit 360 may move the mobile robot 100, for example. The traveling unit 360 may include, for example, at least one driving wheel (e.g., driving wheel 136 of FIG. 1C) for moving the mobile robot 100 and at least one motor (not shown) for rotating the driving wheel.

The sensor unit 370 may include a distance measurement sensor that measures a distance to an object outside the main body 110. The distance measurement sensor may include a LiDAR sensor 175 that acquires information on geometry outside the main body 110. Hereinafter, the distance measurement sensor may be understood based on the LiDAR sensor 175. The sensor unit 370 may include, for example, various sensors that sense information inside/outside the mobile robot 100.

The sensor unit 370 includes, for example, a LiDAR sensor (e.g., LiDAR sensor 175 of FIG. 1A) that acquires geometry information outside the main body 110 using a laser. The sensor unit 370 may include the LiDAR sensor 175 that acquires geometry information outside the body 110 using a laser.

The LiDAR sensor 175 may output a laser to provide information such as a distance to an object that reflects the laser and a location, a direction, and a material of the object and may acquire geometry information of a traveling zone. The mobile robot 100 may acquire 360-degree geometry information using the LiDAR sensor 175.

The mobile robot 100 according to an embodiment of the present disclosure may generate a map by recognizing distances to objects sensed by the LiDAR sensor 175 and locations, directions, and the like of the objects. The mobile robot 100 according to an embodiment of the present disclosure may acquire geometry information of the traveling zone by analyzing a laser reception pattern such as a time difference or signal strength of the laser reflected and received from the outside. In addition, the mobile robot 100 may generate a map using the geometry information acquired through the LiDAR sensor 175.

For example, the mobile robot 100 according to the present disclosure may perform LiDAR slam to determine a movement direction by analyzing surrounding geometry information acquired at the current location through the LiDAR sensor 175. More preferably, the mobile robot 100 according to the present disclosure effectively recognizes an obstacle through a vision-based location recognition using a camera and a LiDAR-based location recognition technology using a laser and an ultrasonic sensor, and create a map by extracting an optimal movement direction with small variance.

The sensor unit 370 may include, for example, an obstacle detection sensor (e.g., obstacle detection sensor 171 of FIG. 1A) for detecting an obstacle on the front, a cliff detection sensor (e.g., cliff detection sensor 172 of FIG. 1D) for detecting the presence or absence of a cliff on the floor in the traveling zone, and the like. The obstacle detection sensor 171 may be provided in plurality at predetermined intervals on an outer circumferential surface of the mobile robot 100. The obstacle detection sensor 171 may include, for example, an infrared sensor, an ultrasonic sensor, a radio frequency (RF) sensor, a geomagnetic sensor, a location sensitive device (PSD) sensor, and the like.

The obstacle detection sensor 171 may be, for example, a sensor that detects a distance to an indoor wall or an obstacle, and hereinafter, an ultrasonic sensor will be described but the present disclosure is not limited in type. The obstacle detection sensor 171 may detect, for example, an object existing in a traveling (movement) direction of the mobile robot 100, particularly, an obstacle, and transmit obstacle information to the controller 350. That is, the obstacle detection sensor 171 may detect a movement passage of the mobile robot 100, a projecting object present on the front or side of the mobile robot 100, furniture, a wall surface, a wall edge, and the like of a house and transfer corresponding information to the controller 350.

The sensor unit 370 may further include, for example, a traveling detection sensor (not shown) that detects a traveling operation of the mobile robot 100 and outputs operation information. The traveling detection sensor may include, for example, a gyro sensor, a wheel sensor, an acceleration sensor, and the like. The gyro sensor may detect, for example, a rotation direction and a rotation angle when the mobile robot 100 moves according to an operation mode. The gyro sensor may detect, for example, an angular velocity of the mobile robot 100 and output a voltage value proportional to the angular velocity.

The wheel sensor may be connected to, for example, the driving wheel 136 (e.g., left wheel 136(L) and right wheel 136(R)) of FIG. 1D) to determine the number of revolutions of the driving wheel 136. Here, the wheel sensor may be, for example, an encoder. The encoder may detect and output the number of revolutions of the left wheel 136(L) and the right wheel 136(R), and the acceleration sensor may detect, for example, a change in speed of the mobile robot 100. The acceleration sensor may be attached to a location adjacent to the driving wheel 136 or may be embedded in the controller 350, for example.

The output unit 380 may include, for example, an audio output unit 381 that outputs an audio signal. The audio output unit may output a notification message such as a warning sound, an operation mode, an operation state, and an error state, information corresponding to a user's command input, and processing results corresponding to a user's command input by a sound.

The audio output unit 381 may convert an electrical signal from the controller 150 into an audio signal and output the same. To this end, the audio output unit may include a speaker or the like.

The output unit 380 nay include, for example, a display 382 that displays information corresponding to a user's command input, a processing result corresponding to the user's command input, an operation mode, an operation state, an error state by an image. According to an embodiment, the display 382 may be configured as a touch screen by forming an inter-layer structure with a touch pad. In this case, the display 382 configured as a touch screen may be used as an input device capable of inputting information by a user's touch in addition to the output device.

The communication unit 390 may include, for example, at least one communication module (not shown) and transmit and receive data to and from an external device. Among external devices that communicate with the mobile robot 100, an external terminal may include, for example, an application for controlling the mobile robot 100, display a map of a traveling zone to be cleaned by the mobile robot 100 through execution of the application, and designate a region to clean a specific region on the map. The external terminal may be, for example, a remote controller, PDA, laptop, smartphone, or tablet equipped with an application for map setting.

The communication unit 390 may transmit and receive signals using a wireless communication method such as Wi-Fi, Bluetooth, beacon, ZigBee, and radio frequency identification (RFID).

Meanwhile, the mobile robot 100 may include, for example, a power supply unit (not shown) provided with a rechargeable battery (e.g., battery 138 of FIG. 1D) to supply power to the robot cleaner. The power supply unit may supply driving power and operating power to each component of the mobile robot 100, for example.

The mobile robot 100 may further include, for example, a battery detection unit (not shown) that detects a remaining battery capacity of the battery 138, a charging state thereof, and the like and transmits detection results to the controller 350. Meanwhile, the information on the remaining battery capacity may be output through, for example, the output unit 380.

The controller 350 may be connected to each component provided in the mobile robot 100, for example. The controller 350 may transmit and receive signals to and from each component provided in the mobile robot 100 and control the overall operation of each component, for example.

The controller 350 may determine a state of the inside/outside of the mobile robot 100, for example, based on the information acquired through the sensor unit 370. The controller 350 may calculate, for example, a rotation direction and a rotation angle using a voltage value output from the gyro sensor.

The controller 350 may calculate, for example, a rotation speed of the driving wheel 136 based on the number of resolutions output from the wheel sensor. Also, the controller 350 may calculate a rotation angle based on, for example, a difference in the number of revolutions of the left wheel 136(L) and the right wheel 136(R).

The controller 350 may determine a change in state of the mobile robot 100 such as starting, stopping, turning, and colliding with an object based on a value output from the acceleration sensor. Meanwhile, the controller 350 may detect, for example, an impact amount based on a change in speed based on the value output from the acceleration sensor, and thus the acceleration sensor may perform the function of an electronic bumper sensor. The controller 350 may detect, for example, a location of an obstacle based on at least two or more signals received through the ultrasonic sensor and control movement of the mobile robot 100 according to the detected location of the obstacle.

According to an embodiment, the obstacle detection sensor 131 provided on the outer surface of the mobile robot 100 may include a transmitter and a receiver. For example, the ultrasonic sensor may be provided such that at least one transmitter and at least two receivers stagger. Accordingly, the transmitter may emit ultrasonic signals at various angles, and at least two or more receivers may receive ultrasonic signals reflected from obstacles at various angles. According to an embodiment, the signal received from the ultrasonic sensor may be subjected to a signal processing process such as amplification or filtering, and then a distance to the obstacle and a direction of the obstacle may be calculated.

Meanwhile, the controller 350 may include, for example, a traveling control module 351, a map creating module 352, a location recognition module 353, and/or an obstacle recognition module 354. In this drawing, for convenience of explanation, the traveling control module 351, the map creating module 352, the location recognition module 353, and/or the obstacle recognition module 354 are described separately, but the present disclosure is limited thereto.

For example, the location recognition module 353 and the obstacle recognition module 354 may be integrated as one recognizer and configured as one recognition module 355. In this case, the recognizer may be trained using a learning technique such as machine learning, and the trained recognizer may recognize the properties of a region, an object, etc., by classifying data input thereafter. According to an embodiment, the map creating module 352, the location recognition module 353, and the obstacle recognition module 354 may be configured as one integrated module.

The traveling control module 351 may control, for example, traveling of the mobile robot 100 and control traveling of the traveling unit 360 according to a traveling setting. The traveling control module 351 may recognize a traveling path of the mobile robot 100 based on the operation of the traveling unit 360, for example. For example, the traveling control module 351 may recognize a current or past movement speed of the mobile robot 100, a distance by which the mobile robot 100 has traveled, and the like based on a rotational speed of the driving wheel 136, and the location of the mobile robot on the map may be updated based on the recognized traveling information.

The map creating module 352 may create, for example, a map for the traveling zone. The map creating module 352 may create and/or update the map in real time based on the acquired information while the mobile robot 100 is traveling, for example.

The map creating module 352 may set, for example, a plurality of movement directions. For example, when a function for creating a map for a traveling zone (hereinafter, a map creating function) is executed, the map creating module 352 may set a direction in which a front surface of the mobile robot 100 faces at a time the function is executed as a first movement direction. In addition, the map creating module 352 may set, for example, a direction in which a left side of the mobile robot 100 faces as a second movement direction, a direction in which a right side of the mobile robot 100 faces as a third direction, and a direction in which a rear surface of the mobile robot 100 faces, which is the direction opposite to the first direction, as a fourth movement direction.

Meanwhile, the plurality of preset movement directions may be fixed and set without being changed even when the mobile robot 100 moves or rotates, while the function of creating a map is executed. For example, in a state where the plurality of movement directions are set, if the mobile robot 100 rotates in a counterclockwise direction, a direction in which the front surface of the mobile robot 100 faces may be the second movement direction, and when the mobile robot 100 goes straight, the traveling direction of the mobile robot 100 may be the second movement direction. Meanwhile, in this drawing, the plurality of movement directions are described as being set in four directions, but the present disclosure is not limited thereto and various directions such as eight directions, sixteen directions, and the like, may be set according to various embodiments.

The map creating module 352 may create a map, for example, based on an image acquired through the image acquisition unit 320. For example, the map creating module 352 may create a map based on an acquisition image acquired through the image acquisition unit 320 while the mobile robot 100 is traveling. The map creating module 352 may detect various features such as lighting, an edge, a corner, blob, a ridge, and the like located in a traveling zone included in each of the acquired images acquired through the image acquisition unit 320.

The map creating module 352 may include, for example, a feature detector that detects features from the acquired image. For example, the feature detector may include Canny, Sobel, Harris & Stephens/Plessey, SUSAN, Shi & Tomasi, Level curve curvature, FAST, Laplacian of Gaussian, Difference of Gaussians, Determinant of Hessian, MSER, PCBR, Grey-level blobs detectors, etc.

The map creating module 352 may create a map, for example, based on the features of the traveling zone detected from the acquired image. Meanwhile, according to various embodiments of the present disclosure, an operation of detecting features from the acquired image may be performed by the location recognition module 353.

The map creating module 352 may create, for example, a map based on the information acquired through the LiDAR sensor 175. For example, the map creating module 352 may acquire geometry information of the traveling zone by analyzing a reception pattern such as a reception time difference and signal strength of a laser output through the LiDAR sensor 175 and reflected and received from an external object. The geometry information of the traveling zone may include, for example, locations of, distances to, and directions of, objects existing around the mobile robot 100.

The map creating module 352 may create a node, for example, based on the geometry information of the traveling zone acquired through the LiDAR sensor 175, and create first map data including the created node. The map creating module 352 may create, for example, a grid map having different cell data for a region with an obstacle and a region without an obstacle through the LiDAR sensor 175. The map creating module 352 may create, for example, second map data by combining the first map data and the grid map through the LiDAR sensor 175.

The location recognition module 353 may determine a location of the mobile robot 100, for example. The location recognition module 353 may determine, for example, a location of the mobile robot 100, while the mobile robot 100 is traveling. The location recognition module 353 may determine the location of the mobile robot 100, for example, based on the acquisition image acquired through the image acquisition unit 320.

For example, while the mobile robot 100 is traveling, the location recognition module 353 may map features of each location of the traveling zone detected from the acquired image to each location based on the map data created by the map creating module 352 and store data regarding the features of each location in the traveling zone mapped to each location of the map, as location recognition data, in the storage unit 305.

Meanwhile, for example, the location recognition module 353 may calculate similarity (probability) of locations by comparing the features of the traveling zone detected from the acquired image and the features of each location of the traveling zone included in the location recognition data stored in the storage unit 305 and determine a location with largest similarity, as a location of the mobile robot 100, based on the calculated similarity (probability) of the locations.

According to an embodiment of the present disclosure, the mobile robot 100 may extract features from the image acquired through the image acquisition unit 320, map the extracted features to the first map data, and determine a location of the mobile robot 100 based on the features mapped to the first map data. According to an embodiment of the present disclosure, the mobile robot 100 may extract features from the image acquired through the image acquisition unit 320, map the extracted features to the second map data, and determine the location of the mobile robot 100 based on the features mapped to the second map data.

Meanwhile, the mobile robot 100 may determine a current location by learning the map through, for example, the traveling control module 351, the map creating module 352, and/or the obstacle recognition module 354 without the location recognition module 353. The obstacle recognition module 354 may detect, for example, an obstacle around the mobile robot 100. For example, the obstacle recognition module 354 may detect an obstacle around the mobile robot 100 based on the acquired image acquired through the image acquisition unit 320 and/or the sensing data acquired through the sensor unit 370.

For example, the obstacle recognition module 354 may detect an obstacle around the mobile robot 100 based on the geometry information of the traveling zone acquired through the LiDAR sensor 175. The obstacle recognition module 354 may determine, for example, whether there is an obstacle hindering the mobile robot 100 from traveling, while the mobile robot 100 is traveling.

When it is determined that an obstacle exists, the obstacle recognition module 354 may determine, for example, a traveling pattern such as straight movement or rotation according to properties of the obstacle and transfer the determined traveling pattern to the traveling control module 351. For example, when the properties of the obstacle is a kind of obstacle (e.g., a projecting object present on the floor) over which the mobile robot 100 may travel, the obstacle recognition module 354 may determine a traveling pattern allowing the mobile robot 100 to continue traveling. Alternatively, for example, when the properties of the obstacle is a kind of obstacle (e.g., a wall surface, furniture, etc.) over which the mobile robot 100 cannot travel, the obstacle recognition module 354 may determine a traveling pattern allowing the mobile robot 100 to rotate.

The mobile robot 100 according to an embodiment of the present disclosure may recognize a human being, an object and perform avoiding based on machine learning. Here, machine learning may refer to that a computer learns through data and solves a problem through the data even if a person does not directly instruct logic to the computer.

Deep learning refers to a method of teaching a computer about the humans' way of thinking based on artificial neural networks (ANNs) for constructing artificial intelligence, which may refer to an artificial intelligence technology that a computer may learn by itself like human beings, although human beings does not teach the computer.

The artificial neural network (ANN) may be implemented in a software form or in a hardware form such as a chip. The obstacle recognition module 354 may include, for example, an artificial neural network (ANN) in the form of software or hardware in which the properties of the obstacle are learned.

For example, the obstacle recognition module 354 may include a deep neural network (DNN) such as a convolutional neural network (CNN), a recurrent neural network (RNN), or a deep belief network (DBN) trained through deep learning. The obstacle recognition module 354 may determine the properties of an obstacle included in image data input based on weights between nodes included in the deep neural network (DNN), for example.

The obstacle recognition module 354 may determine, for example, the properties of the obstacle present in a movement direction using only a partial region of an image acquired by the image acquisition unit 320, in particular, the front camera 120a, rather than using the entire image thereof.

In addition, the traveling control module 351 may control driving of the traveling unit 360 based on the recognized properties of the obstacle, for example. The storage unit 305 may store, for example, input data for determining properties of the obstacle and data for learning the deep neural network (DNN). The storage unit 305 may store, for example, an original image acquired by the image acquisition unit 320 and an extracted image obtained by extracting a predetermined region.

The storage unit 305 may store, for example, weights and biases configuring the deep neural network (DNN) structure. For example, the weights and biases configuring the deep neural network structure may be stored in an embedded memory of the obstacle recognition module 354.

Each time a partial region of an image acquired by the image acquisition unit 320 is extracted, the obstacle recognition module 354 may perform a learning process using the extracted image as training data, or after a predetermined number of extracted images are acquired, the obstacle recognition module 354 may perform the learning process.

That is, for example, the obstacle recognition module 354 may update the deep neural network (DNN) structure such as weight by adding a recognition result each time an obstacle is recognized, or after a predetermined number of training data is secured, the obstacle recognition module 354 may update the DNN structure such as weight by performing the learning process with the secured training data.

Alternatively, the mobile robot 100 may transmit the original image or the extracted image acquired by the image acquisition unit 320 to a predetermined server through the communication unit 390, and receive data related to machine learning from the predetermined server. In this case, the mobile robot 100 may update the obstacle recognition module 354 based on data related to machine learning received from the predetermined server.

Figure 4A:
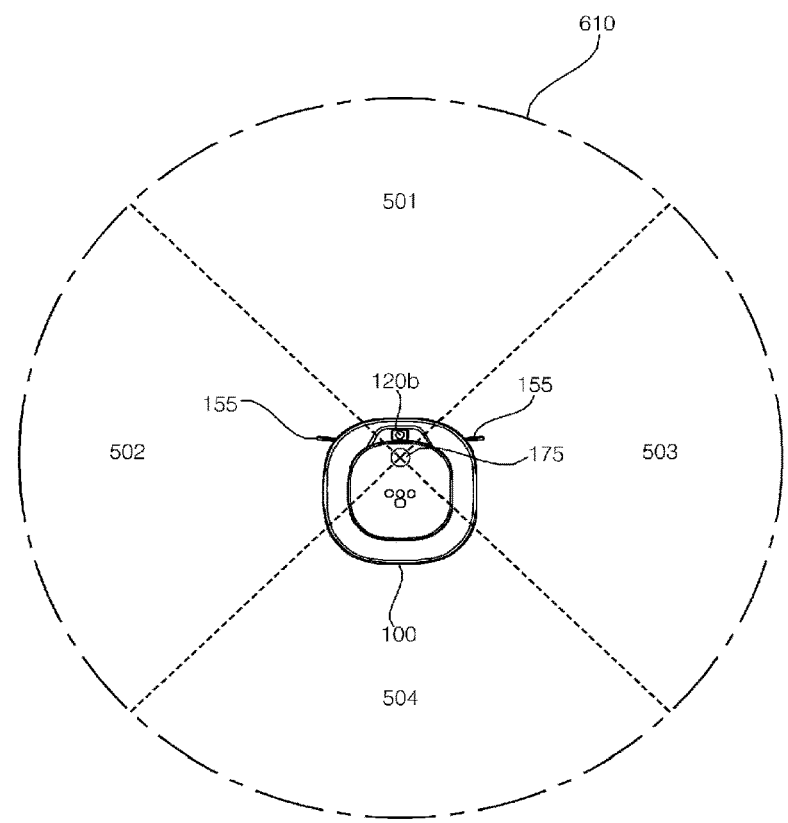
FIG. 4A is a view referred to a description of a light detection and ranging (LiDAR) sensor provided in a mobile robot according to an embodiment of the present disclosure and FIG. 4B is a view referred to a description of traveling a mobile robot according to an embodiment of the present disclosure.
Figure 4B:
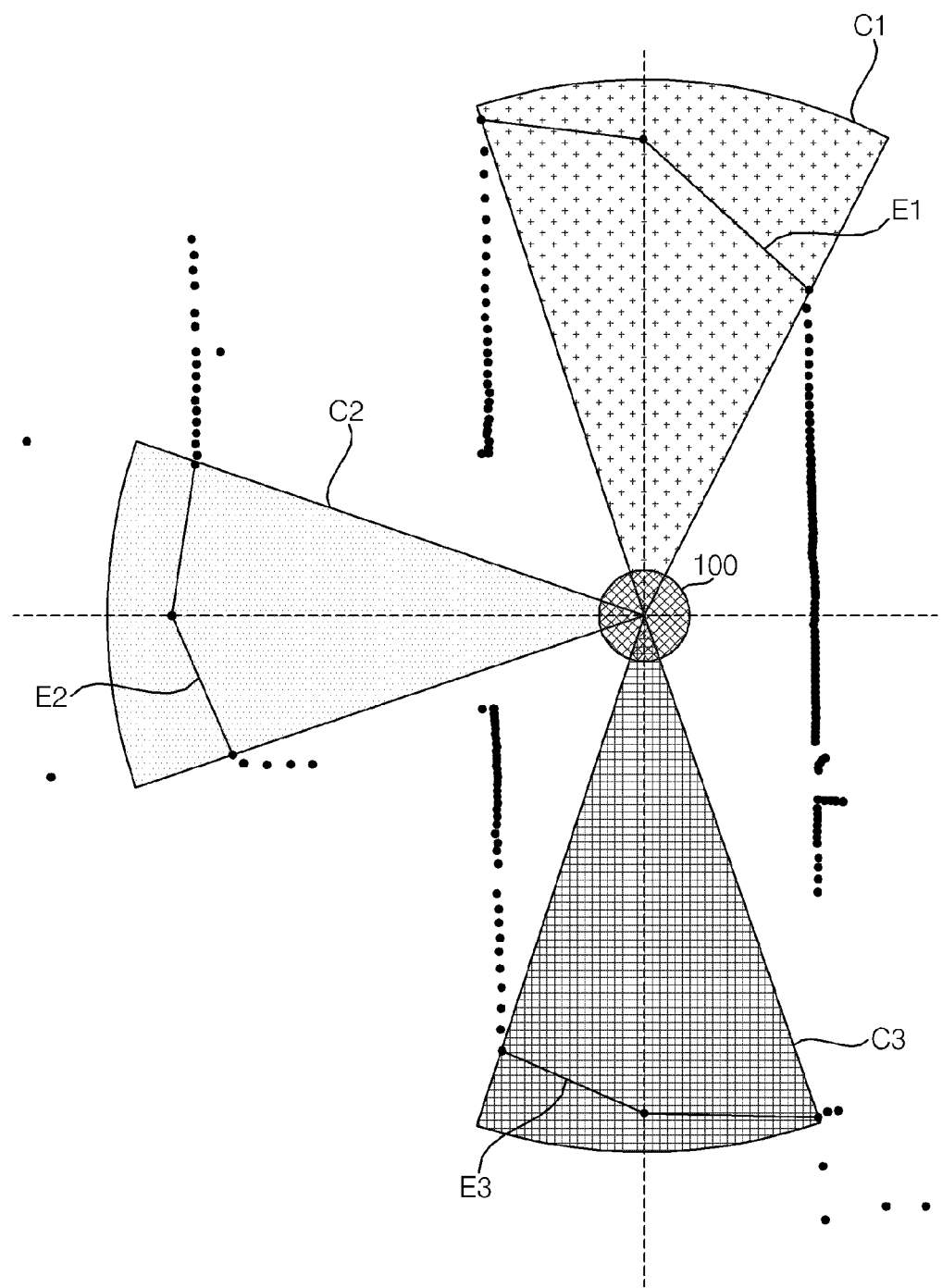

FIG. 4A is a view referred to description of a LiDAR sensor provided in a mobile robot according to an embodiment of the present disclosure, and FIG. 4B is a view referred to description of traveling of a mobile robot according to an embodiment of the present disclosure. Referring to FIG. 4A, the LiDAR sensor 175 may output a laser in all directions of 360 degrees, for example, and receive a laser reflected from an object, thereby acquiring information such as distance to the object, a location, a direction, and a material of the object which reflects the laser and acquiring geometry information of a traveling zone.

The mobile robot 100 may acquire, for example, geometry information within a certain distance according to performance and a setting of the LiDAR sensor 175. For example, the mobile robot 100 may acquire geometry information within a circular region having a radius of a predetermined distance 610 based on the LiDAR sensor 175.

The mobile robot 100 may divide the circular region according to a plurality of movement directions, for example. For example, when a plurality of movement directions are set to four, the circular region may be divided into four regions corresponding to the first movement direction 501 to the fourth movement direction 504 and recognize the geometry information of the traveling zone regarding each region.

FIG. 4B is a view referred to a description of traveling of a mobile robot according to an embodiment of the present disclosure. Referring to FIG. 4B, the mobile robot 100 may acquire geometry information of a traveling zone. For example, the mobile robot 100 may acquire geometry information of the traveling zone through the LiDAR sensor 175, while traveling according to a traveling command.

The mobile robot 100 may extract a free edge from the geometry information regarding four movement directions acquired through the LiDAR sensor 175. Here, the free edge may refer to, for example, information on a space between objects reflecting a laser, in which the mobile robot 100 may travel. As shown in FIG. 4B, the mobile robot 100 may extract the free edge based on an arc drawn by a circular region having a radius of a certain distance based on the LiDAR sensor 175 and both end points of a movement passage with respect to each movement direction.

Free edges E1, E2, and E3 may include a width of a movement passage in each movement direction, location information of the movement passage, information on a center point of the movement passage, and the like, and include information on an angle between both end points of the movement passage and the center line of the mobile robot 100. Here, the center line of the mobile robot 100 may refer to, for example, a straight line extending toward a plurality of movement directions based on the mobile robot 100.

Meanwhile, the mobile robot 100 may extract feature points (hereinafter, an edge) corresponding to an obstacle such as a wall surface from a free edge. Here, the mobile robot 100 may determine a width of the movement passage, a gap between obstacles, and the like based on a gap between the edges. Meanwhile, in order to move along the center of the movement passage, the mobile robot 100 may detect the center point of the movement passage based on the free edge and may travel according to the center point.

Figure 5:
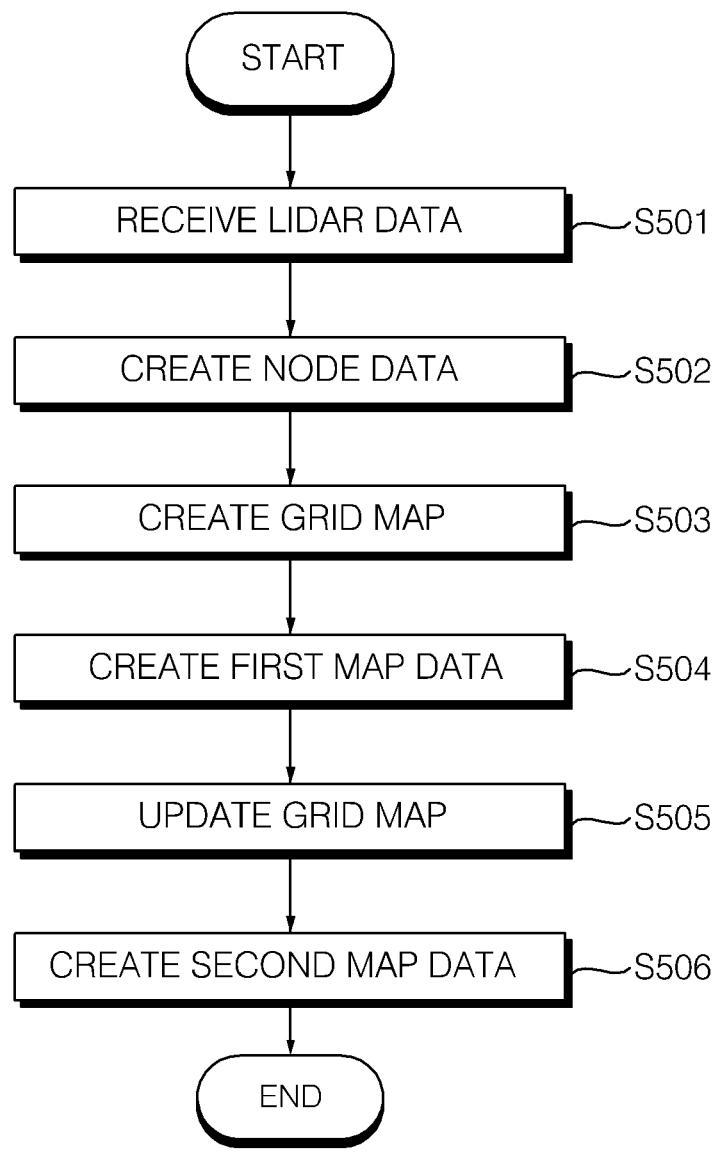
FIG. 5 is a flowchart illustrating a process of creating a map of a mobile robot according to an embodiment of the present disclosure.

FIG. 5 is a flowchart of a process of creating a map of a mobile robot according to an embodiment of the present disclosure. Referring to FIG. 5, the mobile robot 100 may create node-based first map data and grid-based second map data, while moving.

The mobile robot 100 may independently generate the node-based first map data and the grid-based second map data. Creating of the first map data may be understood through FIGS. 6A to 6J. Creating of the second map data may be understood through FIGS. 12A to 12F.

The mobile robot 100 may combine the node-based first map data and the grid-based second map data through the LiDAR data receiving step (S501), the node data creating step (S502), the grid map creating step (S503), the first map data creating step (S504), and the grid map updating step (S505). Hereinafter, a method of combining the first map data and the second map data will be described in detail.

The LiDAR data receiving step (S501) may be a process in which the controller 350 receives the LiDAR data sensed through the LiDAR sensor 175 among the distance measurement sensors. The LiDAR sensor 175 may output a laser and provide information such as a distance, a location, a direction, and a material of an object that reflects the laser, and may acquire geometry information of the traveling zone. The LiDAR data according to an embodiment of the present disclosure may refer to information such as a distance, a location, and a direction of obstacles sensed by the LiDAR sensor 175.

The node data creating step S502 may be a process of creating node data, which is data for a node, based on the LiDAR data. The node may refer to, for example, a point on the traveling zone. The data for the node may include, for example, coordinates on the traveling zone for a node location, information on a plurality of movement directions at the node, information on a relation with another node, and the like.

The node data may include a coordinate value of a node location and a data value of each of the plurality of movement directions, regarding each of the at least one nod. Data values for each of the plurality of movement directions may refer to setting one of a first data value indicating an open movement direction, a second data value indicating a movement direction in which the mobile robot is unable to travel, and a third data value indicating another node. For example, the first data value indicating an open movement direction may be −2, the second data value indicating a movement direction in which the mobile robot is unable to travel may be −1, and the third data value indicating another node may be 1, 2, 3, etc. according to order of node creation.

The grid map creating step S503 may be a process of creating a cell-based grid map based on the LiDAR data and node data. The grid map, which is a map for recognizing a surrounding environment of the mobile robot 100, may refer to a map that expresses the surrounding space as a grid or a cell (hereinafter, a cell) having the same size and indicates the presence or absence of an object in each cell. The mobile robot 100 may create a grid map of the surrounding environment using the distance measurement sensor.

The grid map 400 may be a map in which a predetermined space is divided into cells having the same size and the presence or absence of an object is indicated in each cell. The presence or absence of an object may be indicated through color. For example, a white cell may indicate a region without an object and a gray cell may indicate a region with an object. Therefore, a line connecting the gray cells may represent a boundary line (wall, obstacle, etc.) of a certain space. The color of the cell may be changed through an image processing process.

The controller 350 may create a grid map while creating nodes. The controller 350 may create a grid map after the creation of the node is completed. The grid map creating step (S503) may refer to a process of creating a grid map while simultaneously creating a node.

While creating the node data, the controller 350 may create the grid map within a sensing range of the LiDAR sensor based on the coordinate value for the node location. That is, the controller 350 may create a grid and create a grid map within the sensing range of the LiDAR sensor while moving to the created node.

A sensing range of the LiDAR sensor when creating a grid map may be different from a sensing range in the case of creating node data. For example, the sensing range of the LiDAR sensor when creating the grid map may be 11 meters. For example, when creating node data, the sensing range may be 3 meters.

In the case of creating the grid map based on the node data, the controller 350 may set the sensing range as a sensing range when creating node data. For example, the controller 350 may create a grid and generate a grid map within 3 meters of the sensing range of the LiDAR sensor, while moving to the created node.

The controller 350 may generate a grid map based on the node data until the creation of the node-based first map data is completed. When the creation of the first map data is completed, the controller 350 may finally update and store the grid map based on the node data.

The first map data creating step (S504) may be a process of creating a map for a node based on the created node data. The controller 350 may receive LiDAR data, which is sensing data of the LiDAR sensor, and determine whether at least one open movement direction exists among a plurality of preset movement directions based on the LiDAR data and the node data. The controller 350 may determine a movement direction in which the mobile robot 100 may travel and in which the mobile robot has not travel, among the plurality of movement directions, as the open movement direction.

When at least one open movement direction exists, the controller 350 may update the node data according to a preset condition and determine one of the open movement directions as a traveling direction in which the main body moves. Updating of the node data may include creating a new node or updating a coordinate value of a node location for each of the at least one node and a data value for each of the plurality of movement directions.

If the open movement direction does not exist, the controller 350 may determine whether at least one node requiring updating is present among at least one node based on the node data. The controller 350 may determine a node in which at least one of the data values for each of the plurality of movement directions is set as a first data value indicating an open movement direction, as a node that requires updating.

The controller 350 may control the traveling unit 360 to move the mobile robot 100 to one of the nodes requiring updating if there is a node requiring updating. The controller 350 may complete the creation of the second map data including at least one node based on the node data if there is no node that requires updating. The first map data creating step (S504) may be described in more detail through FIGS. 6A to 6J below.

The grid map updating step S505 may be a process in which the creation of the first map data is completed and the grid map based on the node data is finally updated. The controller 350 may store the grid map based on the updated node data in the storage unit 305. The finally updated node data-based grid map may refer to a map in which the creation of a node has been completed and a cell is indicated within a sensing range (e.g., 3 meters) of the LiDAR sensor, while the mobile robot 100 is moving to create a node.

In the updated grid map, all regions may be searched. In the updated grid map, an unsearched region may exist. In order to identify the search region and the unsearched region and create a map for the unsearched region, a second map data creating process may be performed based on the updated grid map.

The second map data creating step (S506) may be a process of updating the grid map based on the node data that has been recently updated through an image processing process. The controller 350 may divide the updated grid map into a first region which is an empty space according to a result of sensing by the LiDAR sensor, a second region which is a space in which an obstacle exists according to a result of sensing by the LiDAR sensor, and a third region which is not sensed by the LiDAR sensor.

The controller 350 may perform image processing to generate a boundary line between the first region and the third region. The controller 350 display the color of each region to be different, and here, the controller 350 may represent a largest difference between the color of the first region and the color of the third region and perform image processing to indicate a line segment between the first region and the third region.

The controller 350 may determine the image-processed line segment as a boundary line. If there are one or more boundary lines, the controller 350 may select an optimal boundary line, perform planning a path to the optimal boundary line, and update the grid map, while moving along the path. If it is determined that there is no more boundary line, the controller 350 may store the grid map and complete the creation of the second map data.

The second map data which has completely undergone the second map data creating step (S506) may be map data in which the node-based first map data and the grid-based second map data are combined. The second map data creating step S506 may be performed independently. This will be described in detail through FIGS. 12A to 12F hereinafter.

The first map data may be created by a node-based map creating method, which has the advantage of creating map data quickly and safely. The second map data may be generated by a grid map creating method, which has the advantage of creating map data without environmental restrictions based on the first map data. That is, the finally generated second map data may be map data in which the node-based map creating method and the grid-based map creating method, which are fast and safe but do not have environmental restrictions, are combined.

FIGS. 6A to 6J are views illustrating a process of creating first map data of a mobile robot according to an embodiment of the present disclosure. The operation of the mobile robot 100 described in this figure may be understood as an operation of the components (e.g., the controller 350 of FIG. 3) provided in the mobile robot 100.

Figure 6A:
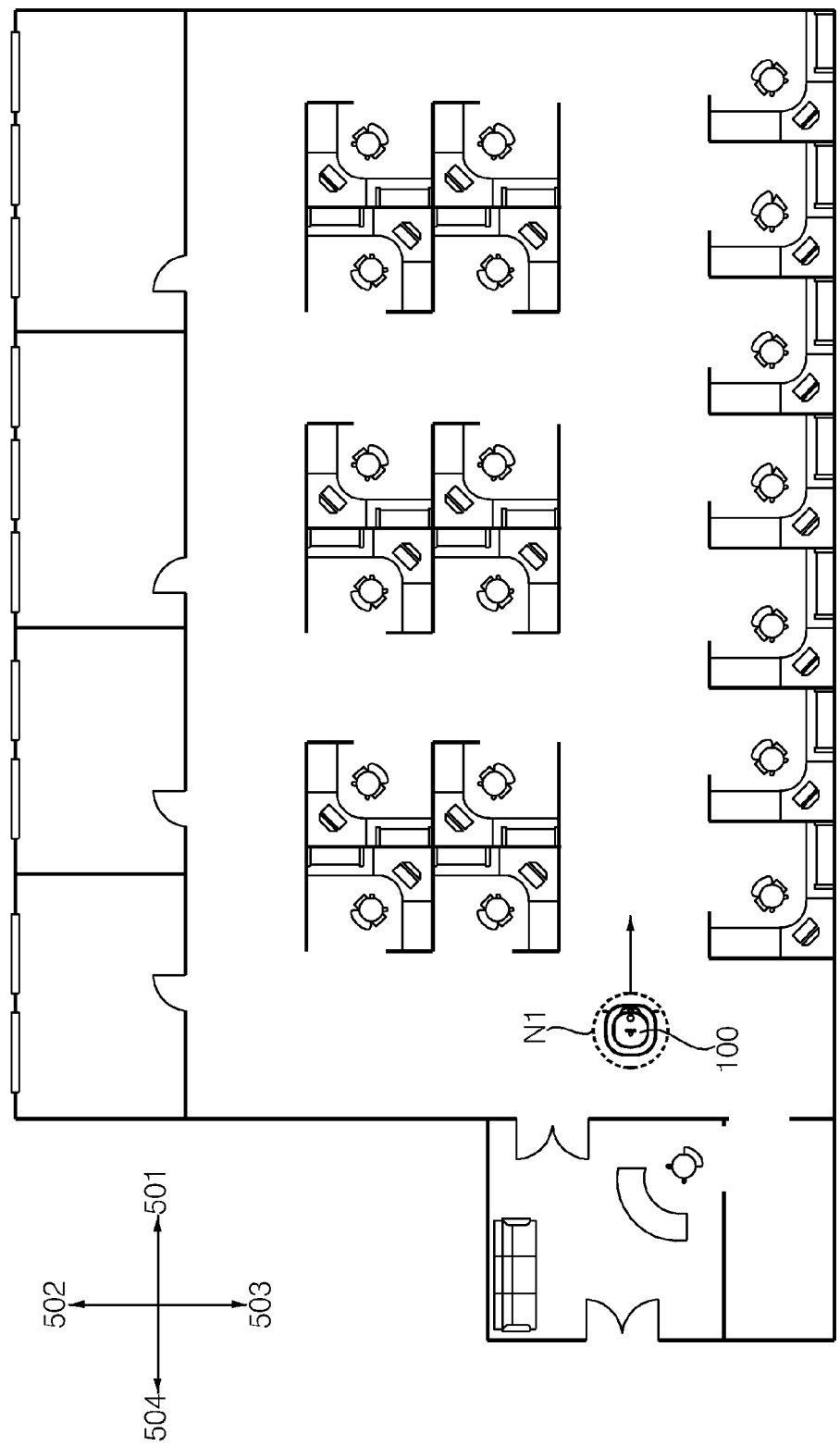
FIGS. 6A to 6J are views illustrating a process of creating first map data of a mobile robot according to an embodiment of the present disclosure.

Referring to FIG. 6A, the mobile robot 100 may set a plurality of movement directions when the map creating function is executed. For example, when the map creating function is executed, the mobile robot 100 may set a direction in which the front surface of the mobile robot 100 faces as a first movement direction 501, a direction in which the left surface of the mobile robot 100 faces as a second movement direction 502, a direction in which the right surface of the mobile robot 100 faces as a third movement direction 503, and a direction in which the rear surface of the mobile robot 100, which is the opposite to the first direction, faces as a fourth movement direction 504.

Meanwhile, when the map creating function is executed, the mobile robot 100 may adjust the location of the mobile robot 100 and set the plurality of movement directions 501 to 504 based on the adjusted location. For example, the mobile robot 100 may detect features of an image for a ceiling (e.g., a ceiling direction) through an upper camera (upper camera 120b of FIG. 1A) that acquires an image for the ceiling in the traveling zone, and adjust the location of the mobile robot 100 based on the detected features.

Meanwhile, when the map creating function is executed, the mobile robot 100 may create a first node N1 corresponding to a current location of the mobile robot 100. For example, the mobile robot 100 may set the coordinates of the first node N1 to (0, 0), and then set coordinates of a subsequently created node based on the coordinates of the first node N1. Here, the coordinates of the node may be, for example, coordinates on a coordinate plane.

The mobile robot 100 may determine whether there is an open movement direction among the plurality of movement directions 501 to 504 through the LiDAR sensor (e.g., LiDAR sensor 175 of FIG. 4A). Here, the open movement direction may refer to, for example, a movement direction in which the mobile robot 100 may travel and a movement direction in which the mobile robot 100 has not previously traveled.

Figure 6B:
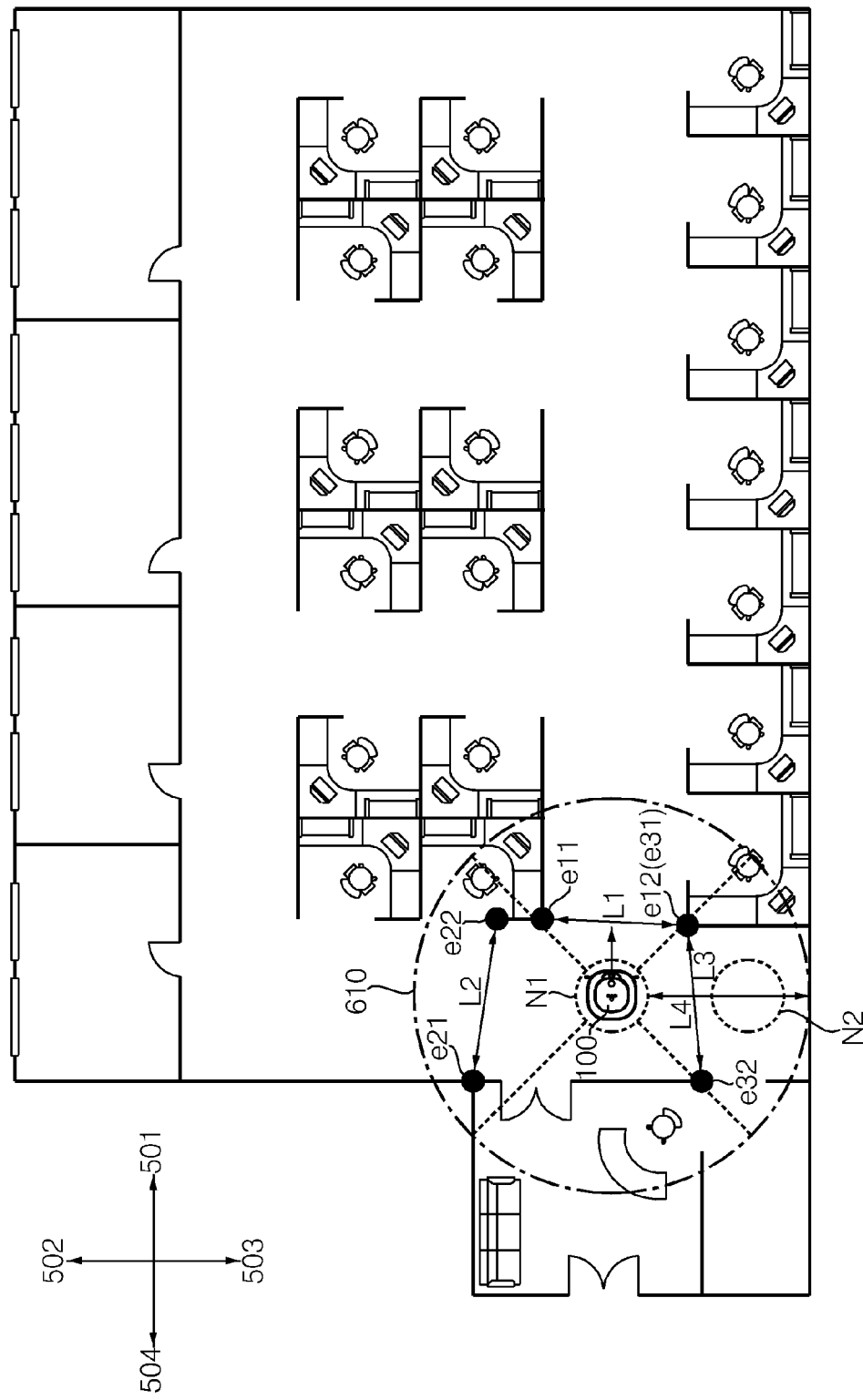

For example, if there is a kind of obstacle (e.g., a wall surface) over which the mobile robot 100 is unable to travel within a certain distance (e.g., 3 meters) from the mobile robot 100 or if a width of a movement passage is less than a predetermined reference width in which the mobile robot 100 may be able to travel, the mobile robot 100 may determine that traveling is impossible. Referring to FIG. 6B, the mobile robot 100 may determine a width of a movement passage regarding the plurality of movement directions 501 to 504 based on the geometry of the traveling zone within a certain distance 610 acquired through the LiDAR sensor 175.

The mobile robot 100 may determine an edge, which is a reference for calculating the width of the movement passage, in each region corresponding to the plurality of movement directions 501 to 504, and determine the width of the movement passage based on an interval between the edges. In this case, when the width of the movement passage is equal to or greater than a reference width (e.g., a diameter of the mobile robot 100), the mobile robot 100 may determine that it is a movement passage available for traveling.

The mobile robot 100 may determine the two edges e11 and e12 in a region corresponding to the first movement direction 501 and determine that a width L1 of the movement passage for the first movement direction 501 is equal to or greater than the reference width based on a distance between the two edges e11 and e12. Meanwhile, a width L3 of the movement passage regarding the third movement direction 503 is greater than or equal to the reference width but it can be seen that there is a kind of obstacle (e.g., a wall surface) over which the mobile robot 100 cannot travel within a predetermined distance 610 from the mobile robot 100.

In addition, also it is determined that, in the fourth movement direction 504, there is a kind of obstacle (e.g., wall surface) over which the mobile robot 100 is unable to travel within the predetermined distance 610 from the mobile robot 100. Accordingly, the mobile robot 100 may determine the first movement direction 501 and the second movement direction 502 as open movement directions.

The mobile robot 100 may determine, for example, whether there is an open movement direction among the plurality of movement directions 501 to 504, and may create a node based on a determination result. For example, if the current traveling direction of the mobile robot 100 is not included in the open movement direction or if a plurality of movement directions including the current traveling direction of the mobile robot 100 are included in the open movement direction, the mobile robot 100 may create a node.

Meanwhile, for example, when only the movement direction set as the current traveling direction of the mobile robot 100 is open, the mobile robot 100 may not create a node and move straight according to the set traveling direction. Meanwhile, for example, the mobile robot 100 may not create a node if there is a node corresponding to the current location. Here, since the first node N1 is created in FIG. 6A, the mobile robot 100 may not create a node.

Meanwhile, in FIG. 6A, it is described that, when the map creating function is executed, the mobile robot 100 creates the first node N1 to correspond to the current location of the mobile robot 100, but the present disclosure It is not limited thereto. Therefore, when the map creating function is executed, since the traveling direction of the mobile robot 100 has not been set, which corresponds to a case where the open traveling direction does not include the current traveling direction of the mobile robot 100, the mobile robot 100 may create the first node N1 after determining whether there is an open movement direction among the plurality of movement directions 501 to 504.

The mobile robot 100 may determine, for example, a direction in which the front surface of the mobile robot 100 faces at a time when the map creating function is executed, as a traveling direction. The mobile robot 100 may determine, for example, one of the open movement directions as the traveling direction. The mobile robot 100 may check, for example, cost of each of the open movement directions and determine a traveling direction by comparing the costs of the open movement directions. Here, the cost may include, for example, a width of the movement passage for each open movement direction, whether it is set as the current traveling direction, and the like.

For example, the mobile robot 100 may compare the widths of the movement passages for each of the open movement directions, and determine a movement direction of the largest movement passage as the traveling direction. In this drawing, since the width L1 of the movement passage regarding the first movement direction 501 is the largest, the first movement direction 501 may be determined as the traveling direction. For example, the mobile robot 100 may maintain the movement direction set as the current traveling direction among the opened movement directions as the traveling direction.

Meanwhile, data regarding the node stored in the mobile robot 100 will be described with reference to Table 1 below.

TABLE 1

| Node | X Coordinate (cm) | Y Coordinate (cm) | First movement direction (501) | Second movement direction (502) | Third movement direction (503) | Fourth movement direction (504) |
|---|---|---|---|---|---|---|
| N1 | 0 | 0 | −2 (open) | −2 (open) | −1 | −1 |

Referring to Table 1, the coordinates of the first node N1 may be set to (0, 0), the first and second movement directions 501 and 502 may be set to −2 indicating that it is open, and the third and fourth movement directions 503 and 504 may be set to −1 indicating that they are not open. Meanwhile, in this drawing, the reference value of the coordinates is described in centimeters (cm), but the present disclosure is not limited thereto.

Meanwhile, in the case of the third movement direction 503, there is a kind of obstacle (e.g., a wall surface) over which the driving robot 10 is unable to travel within a certain distance 610 from the mobile robot 100. Here, however, since a width L3 of the movement passage is equal to or greater than the reference width and there is a region in which the mobile robot 100 may travel, the second node N2 may be created at a location spaced apart by a predetermined distance from the first node N1 in the third movement direction 503. Here, the location of the created node may be determined, for example, in consideration of a distance L4 between the mobile robot 100 and the obstacle.

Data regarding the first node N1 and the second node N2 may be set as shown in Table 2 below.

TABLE 2

| Node | X coordinate (cm) | Y coordinate (cm) | First movement direction (501) | Second movement direction (502) | Third movement direction (503) | Fourth movement direction (504) |
|---|---|---|---|---|---|---|
| N1 | 0 | 0 | −2 (open) | −2 (open) | 2 | −1 |
| N2 | 0 | −200 | −1 | 1 | −1 | −1 |

Referring to Table 2, as the second node N2 is created in the third movement direction 503 of the first node N1, a data value for the third movement direction 503 of the first node N1 may be updated to 2 indicating the second node N2. Meanwhile, the coordinates of the second node N2 may be set to (0, −200), and as the first node N1 is located in the second movement direction 502, a data value for the second movement direction 502 of the second node N2 may be set to 1.

The mobile robot 100 may travel in the first movement direction determined in the traveling direction. The mobile robot 100 may travel along the center of the movement passage, while traveling in the movement passage in the traveling direction. For example, the mobile robot 100 may detect a center point of the movement passage based on an edge which is a reference for calculating a width of the movement passage, while traveling in the movement passage in the traveling direction and may travel along the center point.

Meanwhile, the mobile robot 100 may determine whether there is an open movement direction among the plurality of movement directions 501 to 504, while traveling in the movement passage in the traveling direction. For example, the mobile robot 100 may continuously determine according to a predetermined cycle whether there is an open movement direction among the plurality of movement directions 501 to 504, while traveling in the movement passage in the traveling direction.

Figure 6C:
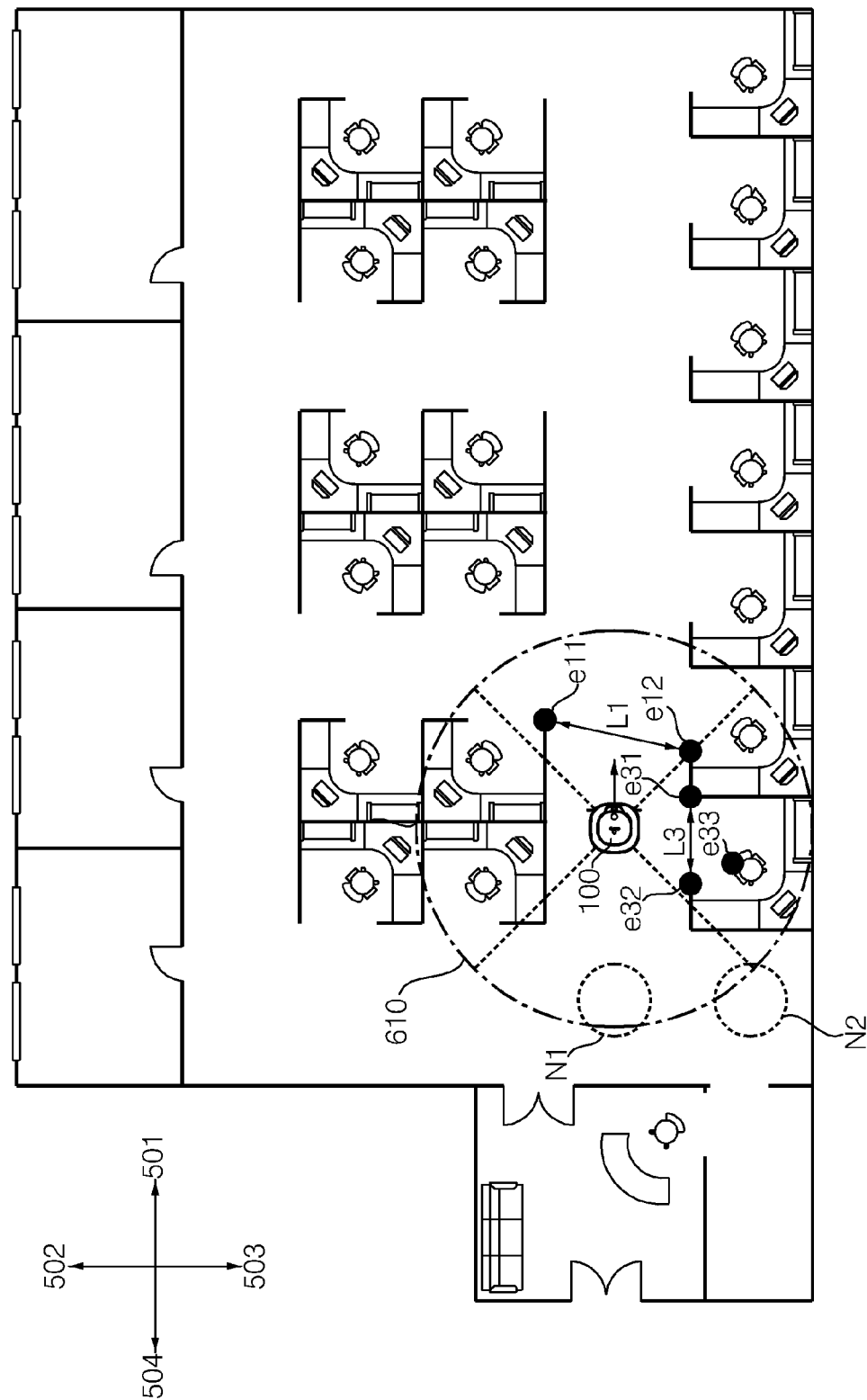

Referring to FIG. 6C, it can be seen that the width L3 of the movement passage relative to the third movement direction 503 is greater than or equal to the reference width but there is a kind of obstacle e33 over which the mobile robot 100 is unable to travel within a predetermined distance 610 from the mobile robot 100.

Meanwhile, since the fourth movement direction 504, which corresponds to a direction opposite to the traveling direction, corresponds to a movement direction in which the mobile robot 100 has already traveled, so the mobile robot 100 may determine it as an unopen movement direction. Accordingly, the mobile robot 100 may determine that only the first movement direction 501, which is the traveling direction, among the plurality of movement directions 501 to 504 is open, and continues to travel in the current traveling direction.

Figure 6D:
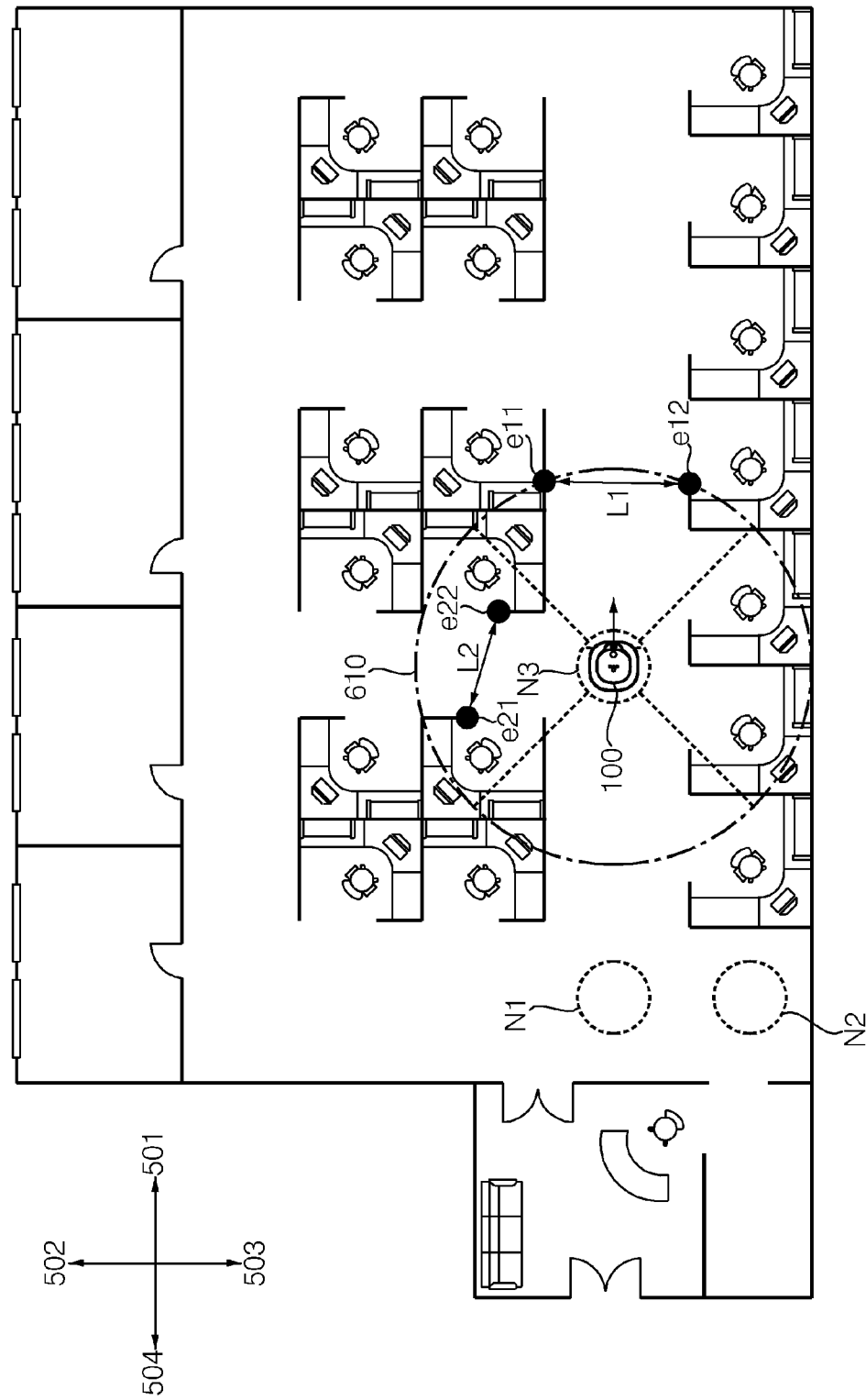

Referring to FIG. 6D, the mobile robot 100 may determine that the first and second movement directions 501 and 502 among the plurality of movement directions 501 to 504, while traveling in the movement passage in the traveling direction, are open movement directions. Since the plurality of movement directions including the first traveling direction 501 which is the current traveling direction corresponds to the opened movement direction, the mobile robot 100 may create a third node N3.

Data for the first node N1 to the third node N3 may be set as shown in Table 3 below.

TABLE 3

| Node | X Coordinate (cm) | Y Coordinate (cm) | First movement direction (501) | Second movement direction (502) | Third movement direction (503) | Fourth movement direction (504) |
|---|---|---|---|---|---|---|
| N1 | 0 | 0 | 3 | −2 (open) | 2 | −1 |
| N2 | 0 | −200 | −1 | 1 | −1 | −1 |
| N3 | 400 | 0 | −2 (open) | −2 (open) | −1 | 1 |

Referring to Table 3, as the third node N3 is created in the first movement direction 501 of the first node N1, the data value for the first movement direction 501 of the first node N1 may be updated to 3 indicating the third node N3. Meanwhile, the coordinates of the third node N3 may be set to (400, 0) based on a traveling distance of the mobile robot 100, and as the first node N1 is located in the fourth movement direction 504, the data value for the fourth movement direction 504 of the third node N3 may be set to 1 indicating the first node N1.

Figure 6E:
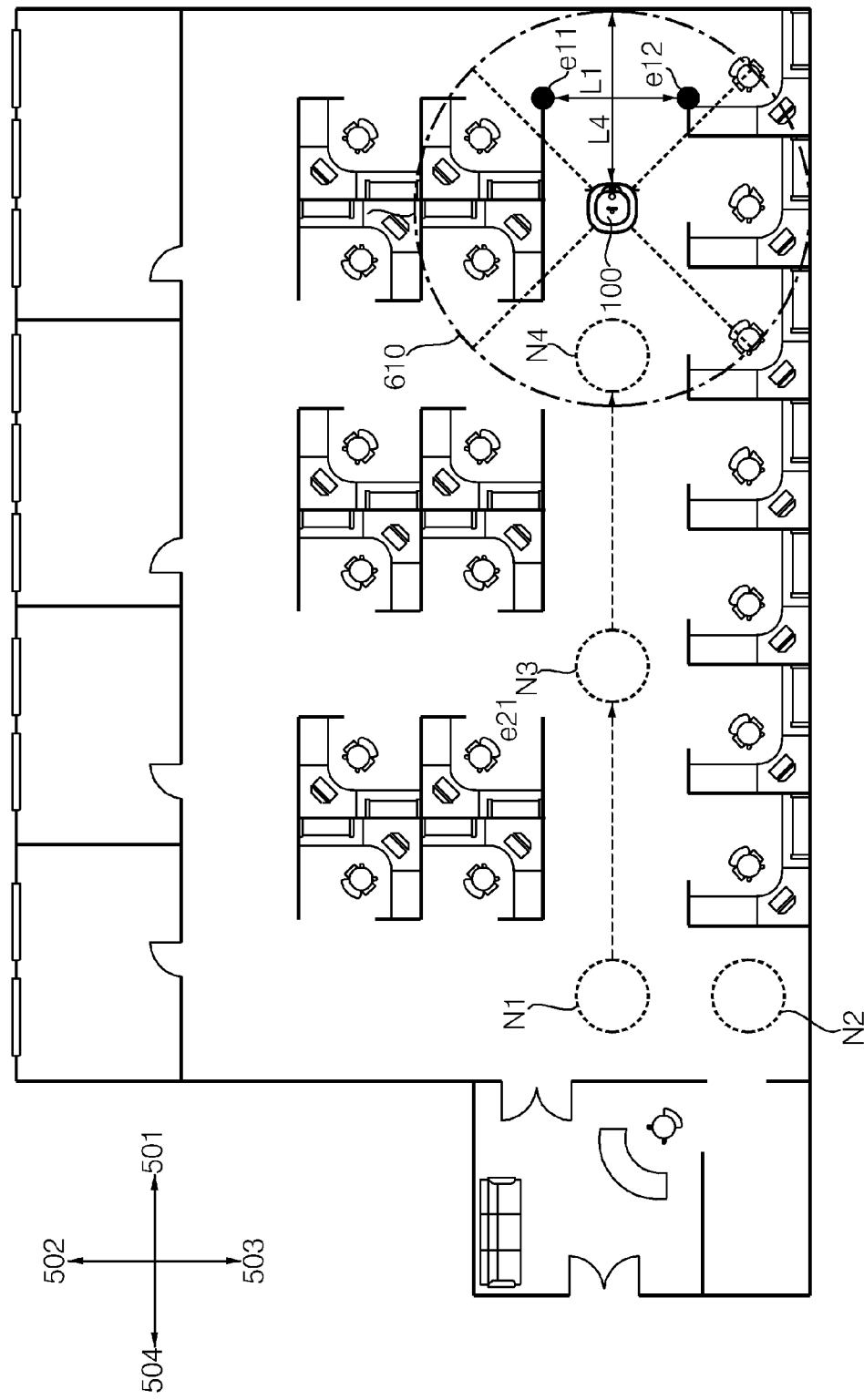

The mobile robot 100 may determine the first movement direction 501 as a traveling direction by comparing the widths L1 and L2 of the movement passages with respect to each of the open first and second movement directions 501 and 502. Referring to FIG. 6E, the mobile robot 100 may generate the fourth node N4 in the same way as the third node N3 is created in FIG. 6D, while traveling in the traveling direction.

Meanwhile, the data for the first node N1 to the fourth node N4 may be set as shown in Table 4 below.

TABLE 4

| Node | X Coordinate (cm) | Y Coordinate (cm) | First movement direction (501) | Second movement direction (502) | Third movement direction (503) | Fourth movement direction (504) |
|---|---|---|---|---|---|---|
| N1 | 0 | 0 | 3 | -2 (open) | 2 | -1 |
| N2 | 0 | -200 | -1 | 1 | -1 | -1 |
| N3 | 400 | 0 | 4 | -2 (open) | -1 | 1 |
| N4 | 800 | 0 | -2 (open) | -2 (open) | -1 | 3 |

Referring to Table 4, as the fourth node N4 is created in the first movement direction 501 of the third node N3, the data value for the first movement direction 501 of the third node may be updated to 4 indicating the fourth node N4. Meanwhile, the coordinates of the fourth node N4 may be set to (800, 0) based on the traveling distance of the mobile robot 100, and since the third node N3 is located in the fourth movement direction 504, the data value for the fourth movement direction 504 of the fourth node N4 may be set to 3 indicating the third node N3.

Meanwhile, while traveling along the traveling direction, the mobile robot 100 may determine that there is a kind of obstacle over which the mobile robot 100 is unable to travel within a predetermined distance 610 with respect to the first movement direction 501. Here, the mobile robot 100 is in a state of traveling according to the traveling direction, and since the width L1 of the movement passage is greater than or equal to the reference width, the mobile robot 100 may continue to move until it approaches the obstacle, unlike the first node N1 created in FIG. 6B. While the mobile robot 100 approaches the obstacle, if there is no open movement direction among the plurality of movement directions 501 to 504, the mobile robot 100 may create a new node at a location near the obstacle.

In addition, the mobile robot 100 may determine whether there is a node requiring updating among the nodes, based on the data for the nodes. Here, if there is a node including -2 indicating open among the data values related to the nodes, the corresponding node may be determined as a node that requires updating.

Figure 6F:
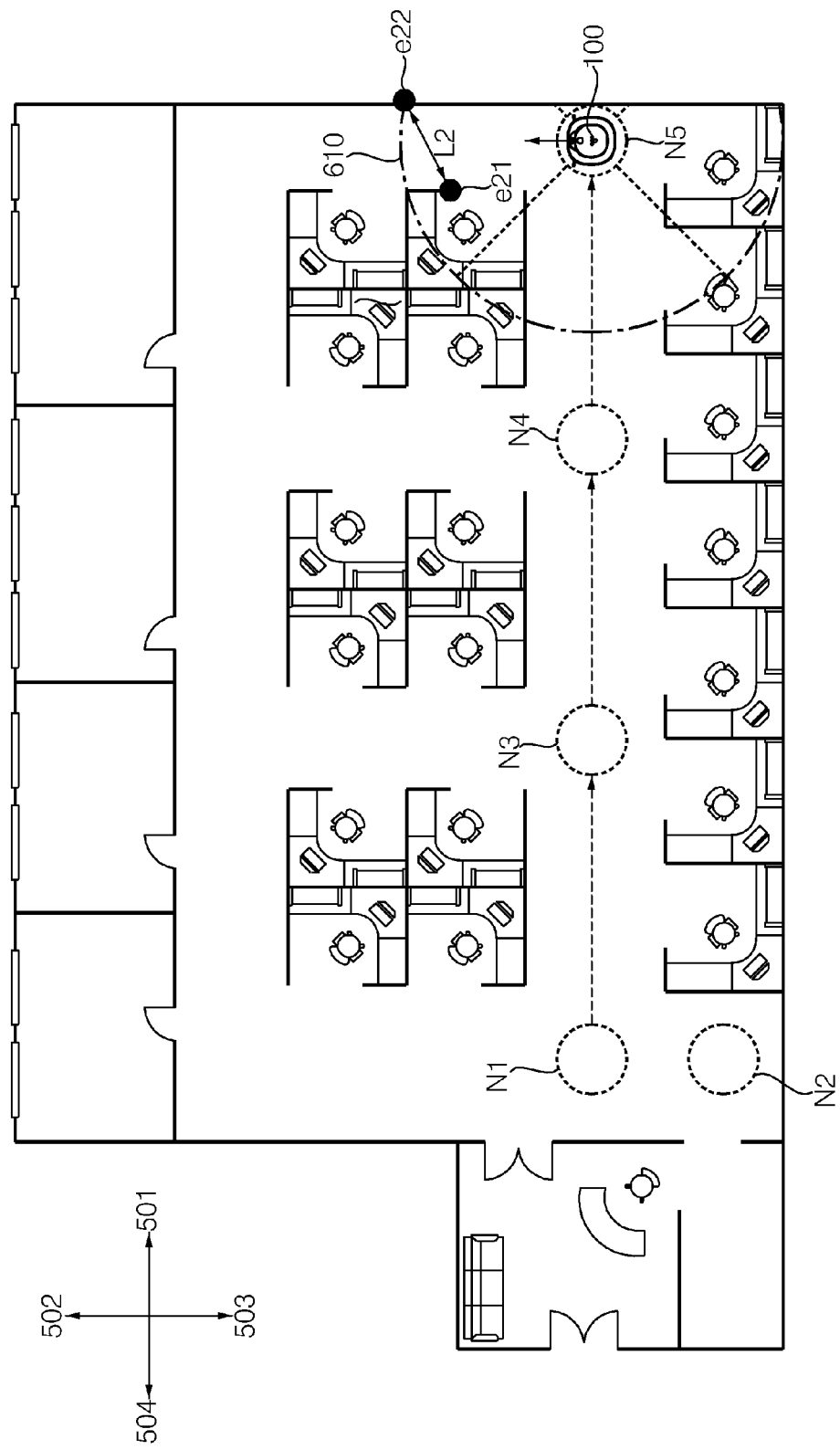

Meanwhile, as shown in FIG. 6F, while the mobile robot 100 approaches the obstacle, if it is determined that the first movement direction 501, which is the traveling direction, among the plurality of movement directions 501 to 504 is not open and another movement direction 502 is open, the mobile robot 100 may create a fifth node N5.

Meanwhile, data for the first node N1 to the fifth node N5 may be set as shown in Table 5 below.

TABLE 5

| Node | X Coordinate (cm) | Y Coordinate (cm) | First movement direction (501) | Second movement direction (502) | Third movement direction (503) | Fourth movement direction (504) |
|---|---|---|---|---|---|---|
| N1 | 0 | 0 | 3 | -2 (open) | 2 | -1 |
| N2 | 0 | -200 | -1 | 1 | -1 | -1 |
| N3 | 400 | 0 | 4 | -2 (open) | -1 | 1 |
| N4 | 800 | 0 | 5 | -2 (open) | -1 | 3 |
| N5 | 1100 | 0 | -1 | -2 (open) | -1 | 4 |

Referring to Table 5, as the fifth node N5 is created in the first movement direction 501 of the fourth node N4, the data value for the first movement direction 501 of the fourth node N4 may be updated to 5 indicating the fifth node N5. Meanwhile, the coordinates of the fifth node N5 may be set to (1100, 0) based on the traveling distance of the mobile robot 100, and as the fourth node N4 is located in the fourth movement direction 504, the data value for the fourth movement direction 504 of the fifth node N5 may be set to 4 indicating the fourth node N4.

Figure 6G:
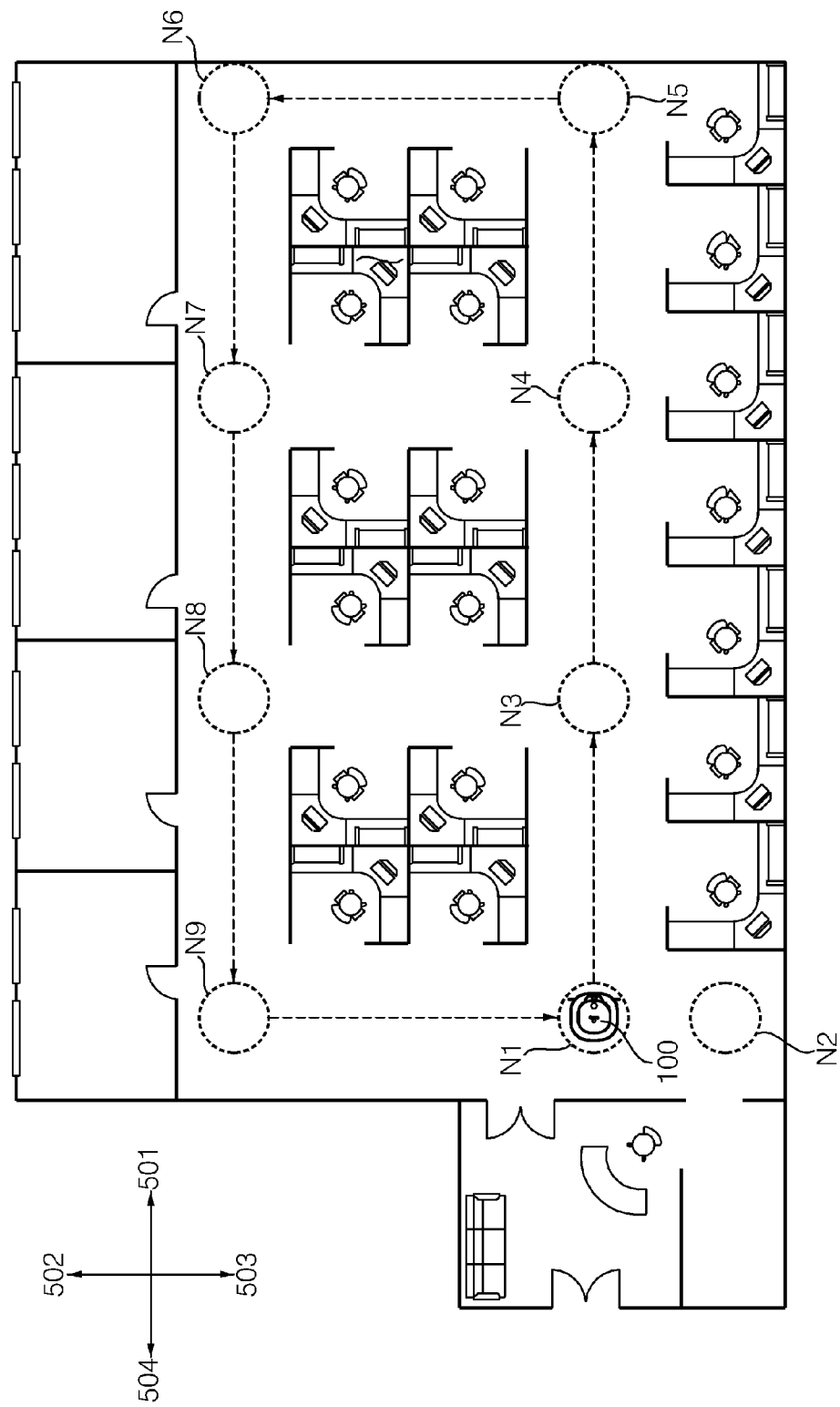

Meanwhile, the mobile robot 100 may determine the second movement direction 502 which is an open movement direction among the plurality of movement directions 501 to 504 as a traveling direction, and travel in the second movement direction 502. Referring to FIG. 6G, the mobile robot 100 may create sixth node N6 to ninth node N9 in the same manner as the case where the third node N3 to the fifth node N5 are created in FIGS. 6C to 6E, while traveling in the traveling direction. Here, in the drawing of the present disclosure, it is described on the basis that doors installed at the entrances of all spaces are closed, and when a door is open, the movement passage of the mobile robot 100 may be different.

Meanwhile, data for the first node N1 to the ninth node N9 may be set as shown in Table 6 below.

TABLE 6

| Node | X Coordinate (cm) | Y Coordinate (cm) | First movement direction (501) | Second movement direction (502) | Third movement direction (503) | Fourth movement direction (504) |
|---|---|---|---|---|---|---|
| N1 | 0 | 0 | 3 | 9 | 2 | -1 |
| N2 | 0 | -200 | -1 | 1 | -1 | -1 |
| N3 | 400 | 0 | 4 | -2 (open) | -1 | 1 |
| N4 | 800 | 0 | 5 | -2 (open) | -1 | 3 |
| N5 | 1100 | 0 | -1 | 6 | -1 | 4 |
| N6 | 1100 | 450 | -1 | -1 | 5 | 7 |
| N7 | 810 | 450 | 6 | -1 | -2 (open) | 8 |
| N8 | 420 | 450 | 7 | -1 | -2 (open) | 9 |
| N9 | 5 | 450 | 8 | -1 | 1 | -1 |

Meanwhile, the mobile robot 100, while traveling in the third movement direction 503 from the ninth node N9, may determine that it returns to the first node N1. The mobile robot 100 may determine that there is no open movement direction at a location corresponding to the first node N1. Here, since the first node N1 is already set at the corresponding location, the mobile robot 100 may not create a new node and determine whether there is a node that requires updating among the nodes based on the data regarding the nodes.

If there is a node that requires updating, the mobile robot 100 may move to any one of the nodes that require updating. Here, the mobile robot 100 may determine a node located at the shortest distance from the current location of the mobile robot 100, among nodes that require updating. For example, the mobile robot 100 may check the distance between the nodes included in the data for the nodes and determine the node located at the shortest distance from the current location of the mobile robot 100.

Meanwhile, after moving to any one of the nodes that require updating, the mobile robot 100 may determine whether there is an open movement direction among the plurality of movement directions 501 to 504. Referring to Table 6 above, the mobile robot 100 may determine the third node N3, the fourth node N4, the seventh node N7, and the eighth node N8 including −2 indicating open in the data value related to the nodes, as nodes that require updating.

Figure 6H:
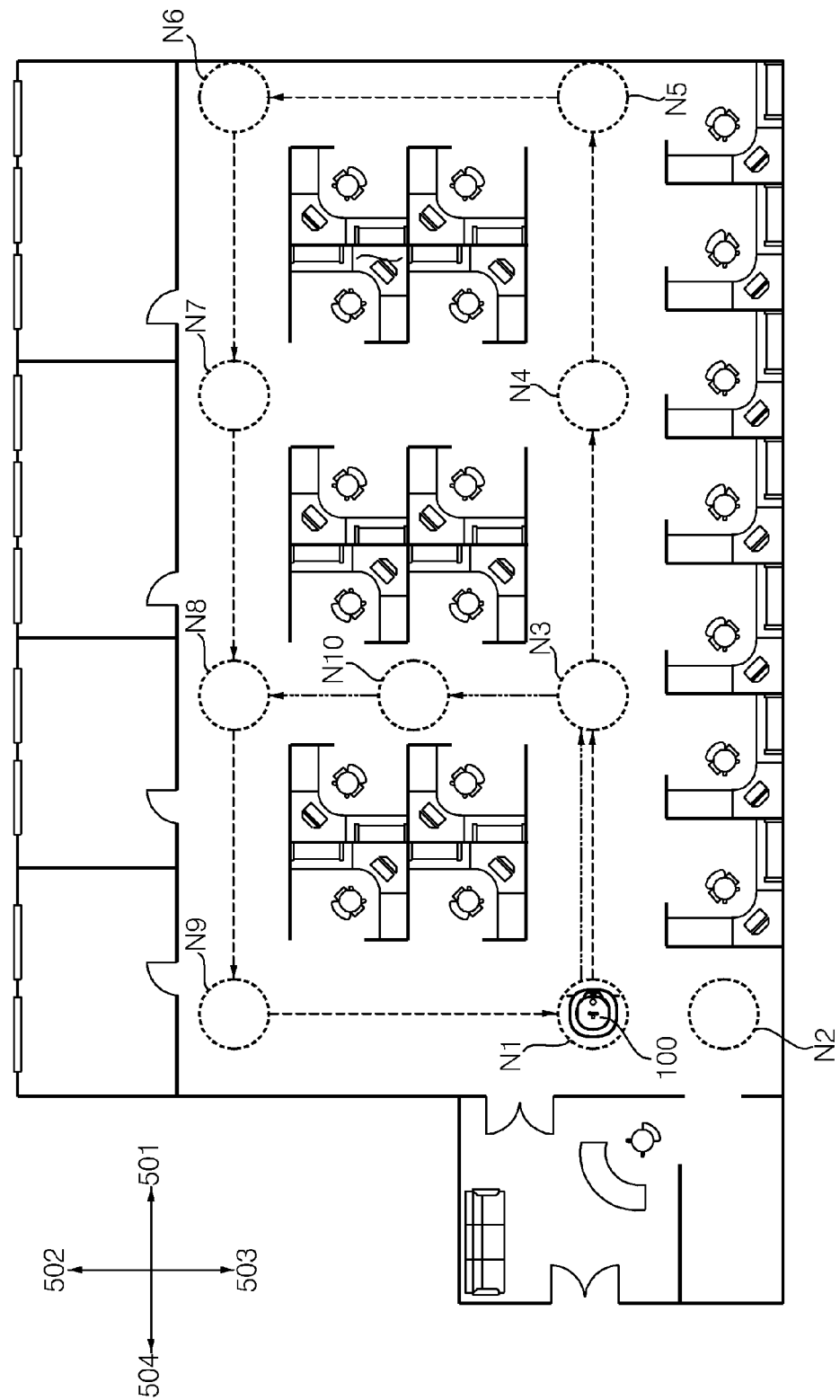

Referring to FIG. 6H, the mobile robot 100 may move to the third node N3 located at the shortest distance among the nodes that require updating, and determine the second movement direction 502 which is an open movement direction in the third node N3 to travel. While the mobile robot 100 is traveling in the second movement direction 502 as the traveling direction, the mobile robot 100 may determine that only the second movement direction 502 as the traveling direction among the plurality of movement directions 501 to 504 is open, and continue to travel in the second movement direction 502.

Meanwhile, if the mobile robot 100 travels only in the traveling direction by a predetermined distance or greater, the mobile robot 100 may create a new node according to the predetermined distance. The mobile robot 100 may generate a tenth node N10 while traveling in the traveling direction. For example, the mobile robot 100 may create a new node and create a more accurate map if only the traveling direction, among the plurality of movement directions 501 to 504, is open, while traveling in the traveling direction. The mobile robot 100 may determine that it has arrived at a location corresponding to the eighth node N8.

Meanwhile, data for the first node N1 to the tenth node N10 may be set as shown in Table 7 below.

TABLE 7

| Node | X Coordinate (cm) | Y Coordinate (cm) | First movement direction (501) | Second movement direction (502) | Third movement direction (503) | Fourth movement direction (504) |
|---|---|---|---|---|---|---|
| N1 | 0 | 0 | 3 | 9 | 2 | −1 |
| N2 | 0 | −200 | −1 | 1 | −1 | −1 |
| N3 | 400 | 0 | 4 | 10 | −1 | 1 |
| N4 | 800 | 0 | 5 | −2 (open) | −1 | 3 |
| N5 | 1100 | 0 | −1 | 6 | −1 | 4 |
| N6 | 1100 | 450 | −1 | −1 | 5 | 7 |
| N7 | 810 | 450 | 6 | −1 | −2 (open) | 8 |
| N8 | 420 | 450 | 7 | −1 | 10 | 9 |
| N9 | 5 | 450 | 8 | −1 | 1 | −1 |
| N10 | 400 | 220 | −1 | 8 | 3 | −1 |

The mobile robot 100 may determine that there is no open movement direction at a location corresponding to the eighth node N8. Here, since the eighth node N8 is already set at the corresponding location, the mobile robot 100 may not create a new node and determine whether there is a node that requires updating among the nodes based on the data regarding the nodes. Referring to Table 7 above, the mobile robot 100 may determine the fourth node N4 and the seventh node N7, which include −2 indicating open in the data value relate to the nodes, as nodes that require updating.

Figure 6I:
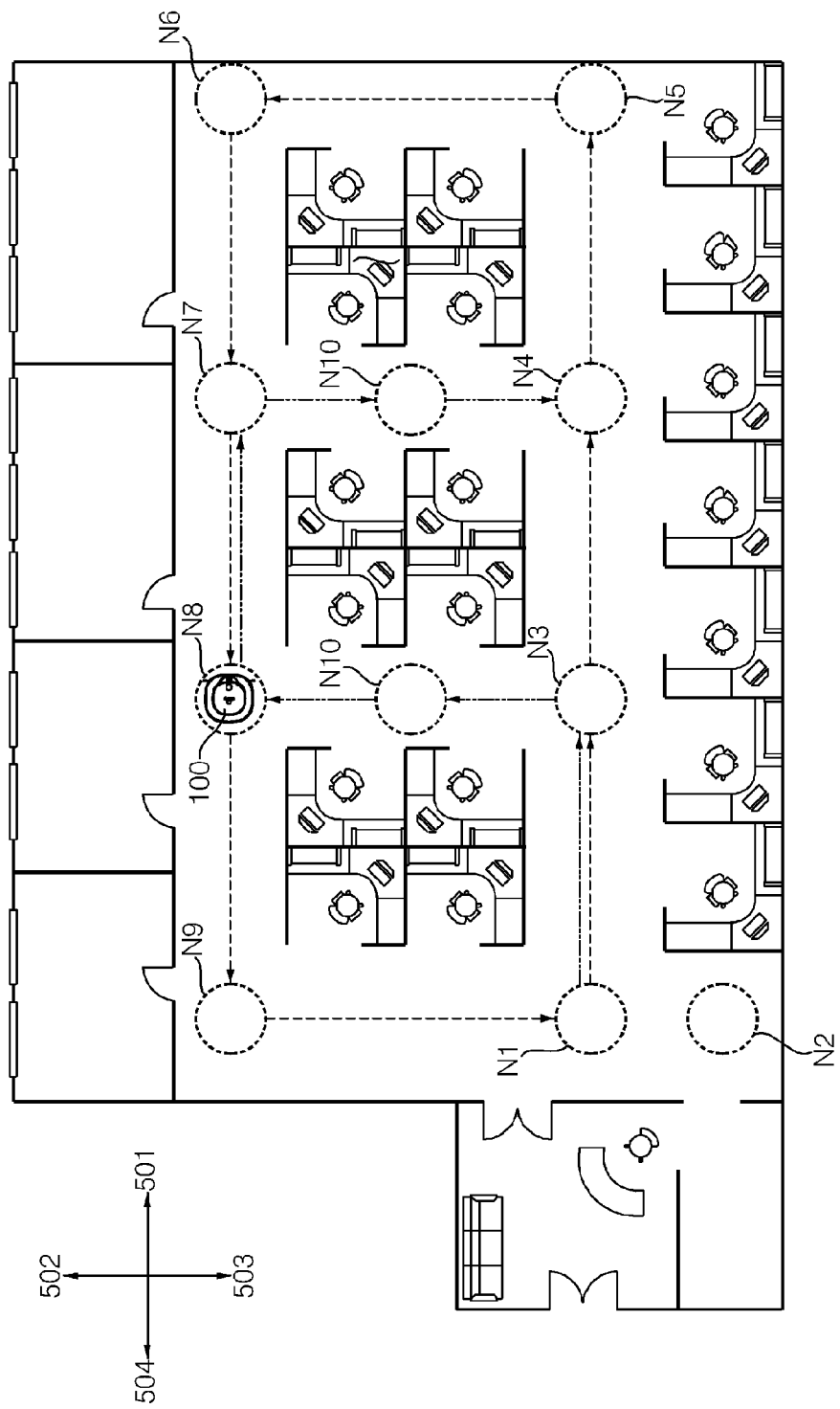

Referring to FIG. 6I, the mobile robot 100 may move to the seventh node N7 located at the shortest distance among the nodes that require updating, and determine the third movement direction 503 which is an open movement direction at the seventh node N7 to travel. As illustrated in FIG. 6H, while the mobile robot 100 travels in the third movement direction 503 which is the traveling direction, the mobile robot 100 may determine that only the third movement direction 503 which is the traveling direction among the plurality of movement directions 501 to 504 is open, and continue to travel in the current traveling direction.

Meanwhile, while traveling in the traveling direction, the mobile robot 100 may create the eleventh node N11 to create a more accurate map. The mobile robot 100 may determine that it has arrived at a location corresponding to the fourth node N4 and that there is no open movement direction at the location corresponding to the fourth node N4. In addition, since the fourth node N4 is previously set at the corresponding location, the mobile robot 100 may not create a new node and determine whether there is a node that requires updating among the nodes based on the data regarding the nodes.

Meanwhile, the data for the first node N1 to the eleventh node N11 may be set as shown in Table 8 below.

TABLE 8

| Node | X Coordinate (cm) | Y Coordinate (cm) | First movement direction (501) | Second movement direction (502) | Third movement direction (503) | Fourth movement direction (504) |
|---|---|---|---|---|---|---|
| N1 | 0 | 0 | 3 | 9 | 2 | −1 |
| N2 | 0 | −200 | −1 | 1 | −1 | −1 |
| N3 | 400 | 0 | 4 | 10 | −1 | 1 |
| N4 | 800 | 0 | 5 | 11 | −1 | 3 |
| N5 | 1100 | 0 | −1 | 6 | −1 | 4 |
| N6 | 1100 | 450 | −1 | −1 | 5 | 7 |
| N7 | 810 | 450 | 6 | −1 | 11 | 8 |
| N8 | 420 | 450 | 7 | −1 | 10 | 9 |
| N9 | 5 | 450 | 8 | −1 | 1 | −1 |
| N10 | 400 | 220 | −1 | 8 | 3 | −1 |
| N11 | 810 | 230 | −1 | 7 | 4 | −1 |

The mobile robot 100 may determine that there is no more node that requires updating based on the data regarding the nodes, and store a created global topological map in the storage unit 305 to complete the creation of the first map data.

Figure 6J:
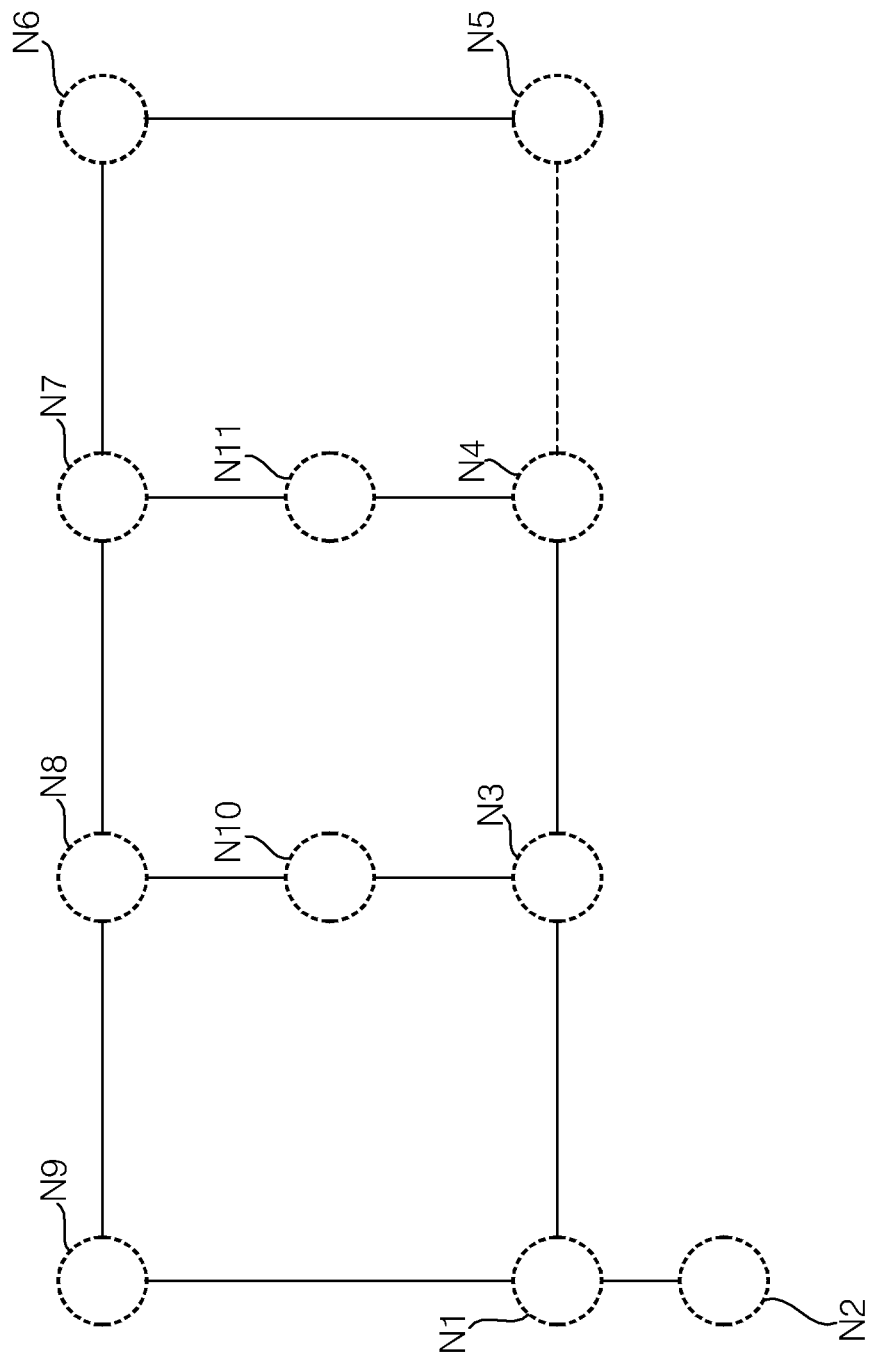

Referring to FIG. 6J, the mobile robot 100 may check relationships between nodes and determine a movement passage based on the created global topological map. Although not shown in the drawing, the controller 350 may create each node and simultaneously create a grid map, while moving the mobile robot 100 based on the node data.

Unlike the node-based map creating method set in four directions or eight directions, the grid map creating method is not limited in direction, and thus a map may be smoothly created even in an environment such as a forked road. However, according to the grid map-based map creating method, the mobile robot 100 cannot move to the center of a passage and there is a possibility of delay of map creation due to path repetition, and thus first map data based on a node is preferentially created and second map data based on a grid may be created thereafter.

Figure 7:
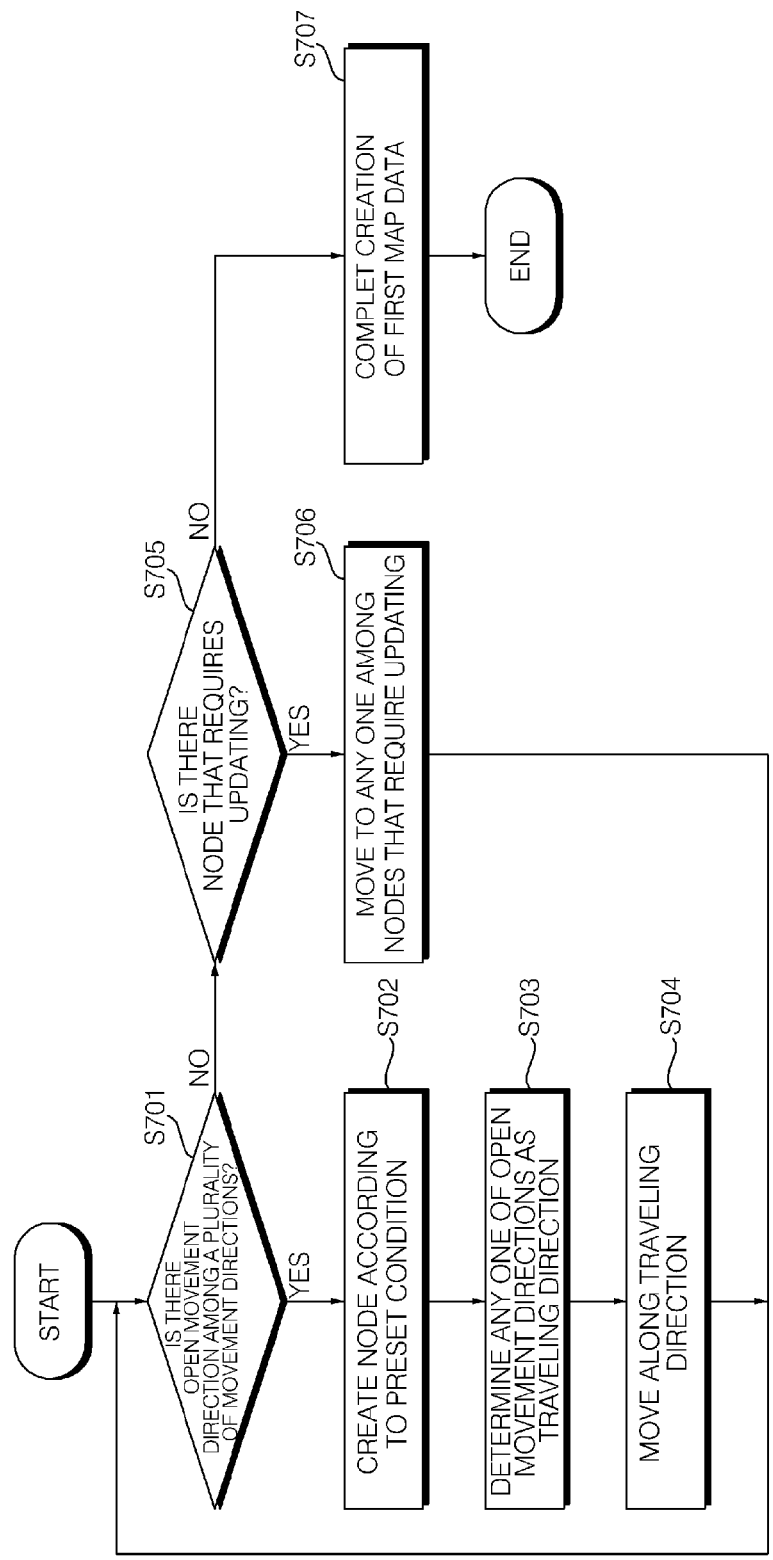
FIG. 7 is a flowchart illustrating a method of creating first map data of a mobile robot according to an embodiment of the present disclosure.

FIG. 7 is a flowchart illustrating a method of creating first map data of a mobile robot according to an embodiment of the present disclosure. Referring to FIG. 7, in step S701, the mobile robot 100 may determine whether there is an open movement direction among the plurality of movement directions 501 to 504.

For example, regarding each of a plurality of preset movement directions 501 to 504, the mobile robot 100 may determine whether a kind of obstacle (e.g., wall surface) over which the mobile robot 100 is unable to travel exists within a predetermined distance (e.g., 3 meters) from the mobile robot 100, whether a width of a movement passage is equal to or greater than a predetermined reference width by which the mobile robot 100 may travel, and whether the mobile robot 100 is in a direction in which it has not travel.

The mobile robot 100 may create a node according to a preset condition if there is an open movement direction among the plurality of movement directions 501 to 504 in step S702. For example, if the current traveling direction of the mobile robot 100 is not included in the open movement direction or if a plurality of movement directions including the current traveling direction of the mobile robot 100 is included in the open movement direction, the mobile robot 100 may create a node.

Meanwhile, for example, if only the movement direction set as the current traveling direction of the mobile robot 100 is open, the mobile robot 100 may go straight according to a set traveling direction, without creating a node. Meanwhile, for example, the mobile robot 100 may not create a node if there is a node corresponding to the current location. Meanwhile, the data for the nodes may include a data value regarding whether the plurality of movement directions 501 to 504 are open at a location corresponding to the node.

In step S703, the mobile robot 100 may determine one of the open movement directions as the traveling direction of the mobile robot 100. For example, the mobile robot 100 may compare the widths of the movement passages for each of the open movement directions, and determine a movement direction of a movement passage having the largest width as the traveling direction. Alternatively, for example, the mobile robot 100 may maintain a movement direction set as the current traveling direction among the open movement directions, as the traveling direction.

The mobile robot 100 may move in the movement direction determined as the traveling direction in step S704. Here, the mobile robot 100 may travel along the center of the movement passage, while traveling in the movement passage in the traveling direction.

For example, the mobile robot 100 may detect a center point of the movement passage based on an edge which is a reference for calculating the width of the movement passage, while traveling in the movement passage in the traveling direction, and travel along the center point. Meanwhile, the mobile robot 100 may continue to determine whether there is an open movement direction among the plurality of movement directions 501 to 504, while traveling in the movement passage in the traveling direction.

Meanwhile, in step S705, if there is no open movement direction among the plurality of movement directions 501 to 504, the mobile robot 100 determines whether there is a node that requires updating among the nodes. For example, the mobile robot 100 checks data values for each node, and if there is a node including a data value indicating an open movement direction among the data values for the plurality of movement directions 501 to 504, the mobile robot 100 may determine the corresponding node as a node that requires updating.

In step S706, if there is a node that requires updating, the mobile robot 100 may move to any one of nodes that requires updating. For example, the mobile robot 100 may move to a node located at the shortest distance from the current location of the mobile robot 100 among nodes that require updating. Meanwhile, if there is no node that requires updating, the mobile robot 100 may store the created global topological map in the storage unit 305 to complete the map creation in step S707.

Figure 8A:
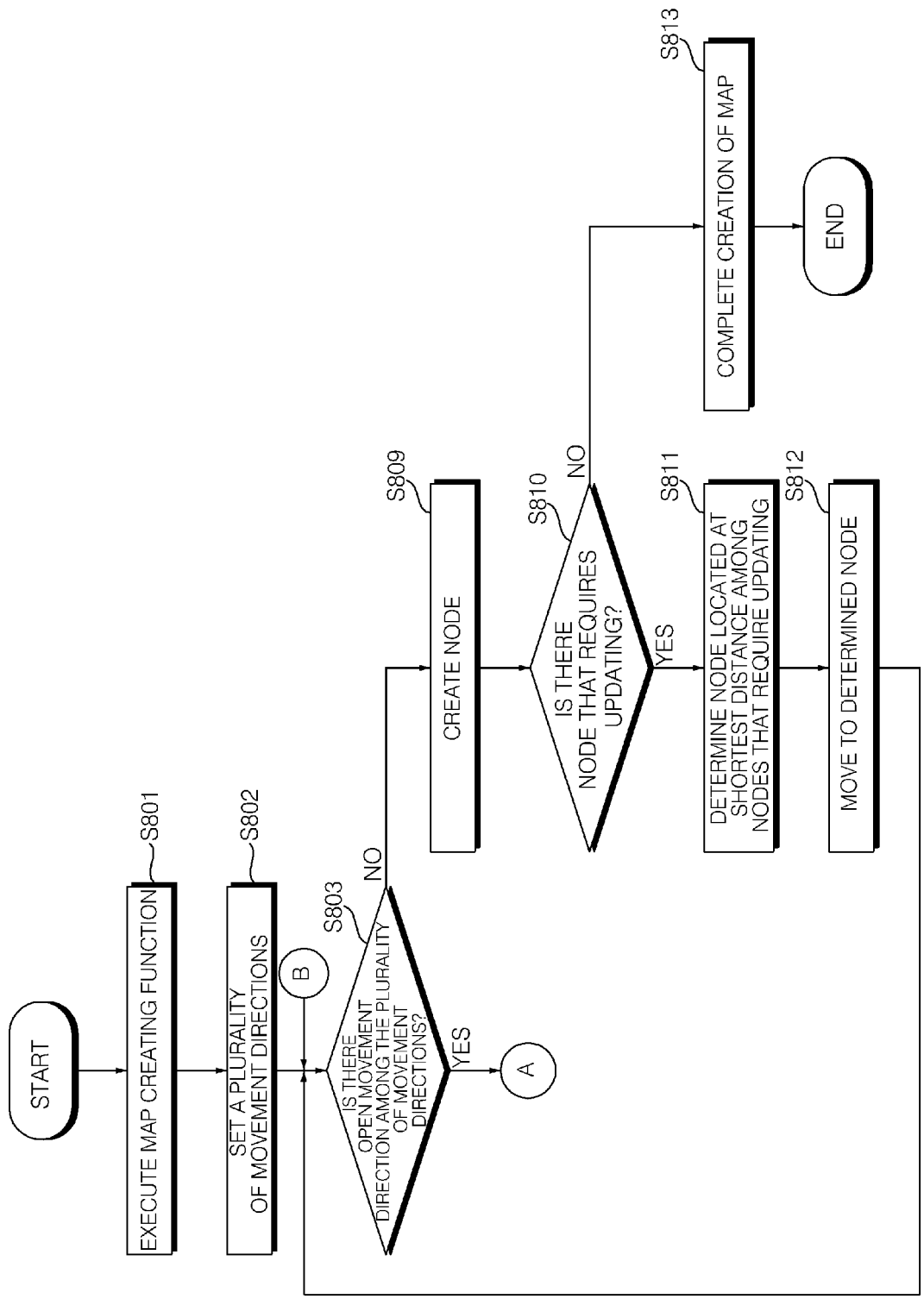
FIGS. 8A and 8B are flowcharts illustrating a method of creating first map data of a mobile robot according to an embodiment of the present disclosure.
Figure 8B:
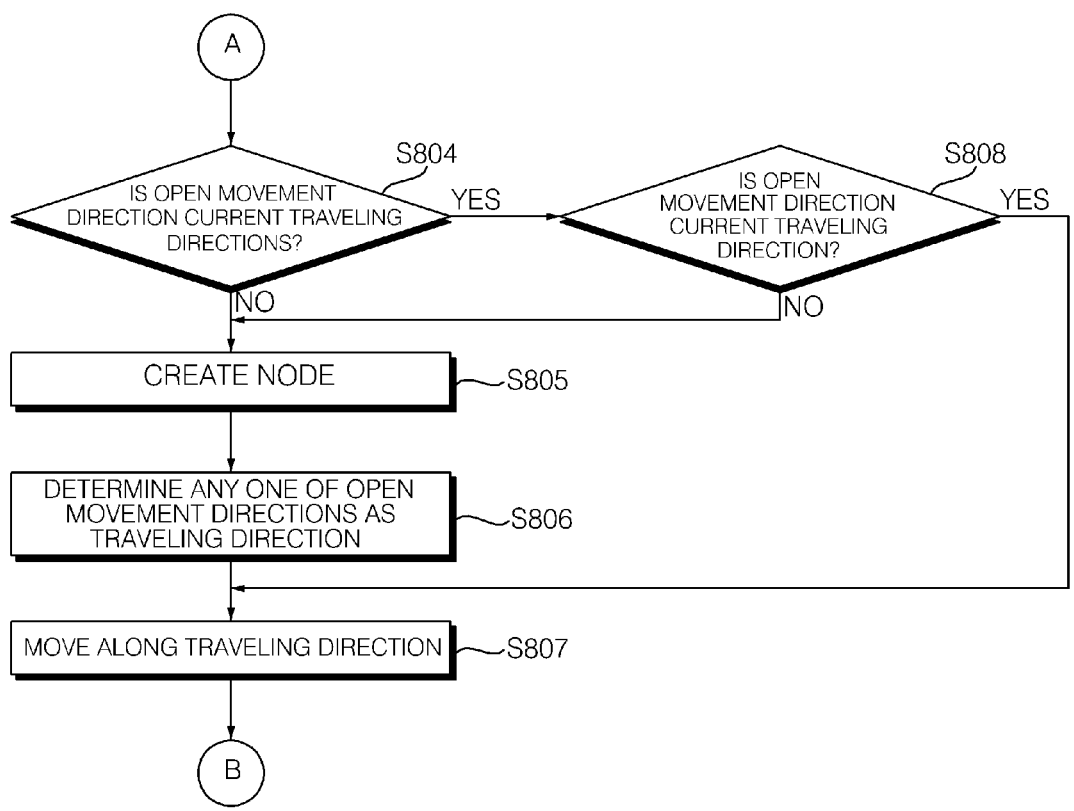

FIGS. 8A and 8B are views illustrating a flowchart of a method for creating first map data of a mobile robot according to an embodiment of the present disclosure. Referring to FIG. 8A, the mobile robot 100 may execute a map creating function in step S801. For example, the mobile robot 100 may execute the map creating function when power is turned on or when a command for executing the map creating function is input from the user.

The mobile robot 100 may set a plurality of movement directions 501 to 504 in step S802. For example, when the map creating function is executed, the mobile robot 100 may determine a direction in which the front surface of the mobile robot 100 faces at the time when the map creating function is executed as a first movement direction 501, a direction in which the left surface of the mobile robot 100 faces as a second movement direction 502, a direction in which the right surface of the mobile robot 100 faces as a third movement direction 503, and a direction in which the rear surface of the mobile robot 100 which is the opposite to the first direction faces as a fourth movement direction 504.

The mobile robot 100 may determine whether there is an open movement direction among the plurality of movement directions 501 to 504 in step S803. For example, for each of the plurality of preset movement directions 501 to 504, the mobile robot 100 may determine whether a kind of obstacle (e.g., wall surface) over which the mobile robot 100 is unable to travel does not exist within a predetermined distance (e.g., 3 meters) from the mobile robot 100, whether a width of a movement passage is equal to or greater than the predetermined reference width by which the mobile robot 100 may travel, and whether the mobile robot 100 is in a direction in which it has not traveled yet.

Referring to FIG. 8B, if there is an open movement direction, whether the current traveling direction of the mobile robot 100 is included in the open movement direction may be determined in step S804. Here, at a time when the map creating function is executed, the traveling direction may not be set, and in this case, it may be determined that the current traveling direction of the mobile robot 100 is not included in the open movement direction.

The mobile robot 100 may generate a node for the current location of the mobile robot 100 if the current traveling direction of the mobile robot 100 is not included in the open movement direction in step S805. The mobile robot 100 may determine one of the open movement directions as the traveling direction in step S806. For example, the mobile robot 100 may compare the widths of the movement passages for each of the open movement directions and determine a movement direction of the movement passage having the largest width as a traveling direction.

The mobile robot 100 may move in the movement direction determined in the traveling direction in step S807. Here, the mobile robot 100 may travel along the center of the movement passage, while traveling in the movement passage in the traveling direction.

For example, the mobile robot 100 may detect a center point of the movement passage based on an edge which is a reference for calculating a width of the movement passage, while traveling in the movement passage in the traveling direction and may travel along the center point. Meanwhile, the mobile robot 100 may determine whether there is an open movement direction among the plurality of movement directions 501 to 504, while traveling in the movement passage in the traveling direction.

Meanwhile, if the current traveling direction of the mobile robot 100 is included in the open movement direction, the mobile robot 100 may determine whether only the current traveling direction is an open traveling direction in step S808. Here, if there are a plurality of open movement directions including the current traveling direction, a node for the current location of the mobile robot 100 may be created in step S805. Meanwhile, if only the current traveling direction among the plurality of movement directions 501 to 504 is an open movement direction, the mobile robot 100 may continue to move in the movement direction determined as the traveling direction in step S807.

Meanwhile, referring back to FIG. 8A, the mobile robot 100 may create a node if there is not open movement direction in step S809. Here, if a node is previously set at the corresponding location, the mobile robot 100 may not create a new node.

The mobile robot 100 may determine whether there is a node that requires updating, among the nodes in step S810. For example, the mobile robot 100 checks data values for each node, and if there is a node including a data value indicating an open movement direction among the data values for the plurality of movement directions 501 to 504, the mobile robot 100 may determine the corresponding node as a node that requires updating.

If there is a node that requires updating, the mobile robot 100 may determine one of the nodes requiring updating in step S811. For example, the mobile robot 100 may determine a node located at the shortest distance from the current location of the mobile robot 100 among nodes that require updating.

The mobile robot 100 may move to the node determined in step S811 in step S812. For example, the mobile robot 100 may move to the node located at the shortest distance from the current location of the mobile robot 100 among the nodes that require updating. Meanwhile, if there is no node that requires updating, the mobile robot 100 may store the created global topological map in the storage unit 305 to complete the map creation in step S813.

As described above, according to various embodiments of the present disclosure, a node may be created in real time while the mobile robot 100 is moving, and a connection relationship between nodes may be accurately set. In addition, according to various embodiments of the present disclosure, while creating the topological map, the mobile robot 100 may move along the center of the movement passage, whereby the mobile robot 100 may move, while minimizing the operation of avoiding an obstacle, and thus the topological map providing a more stable movement path may be created. In addition, according to various embodiments of the present disclosure, the mobile robot 100 may accurately set information on each of the nodes, such as data values for a plurality of movement directions 501 to 504, so that a topological map providing a more accurate movement passage may be created.

Figure 9:
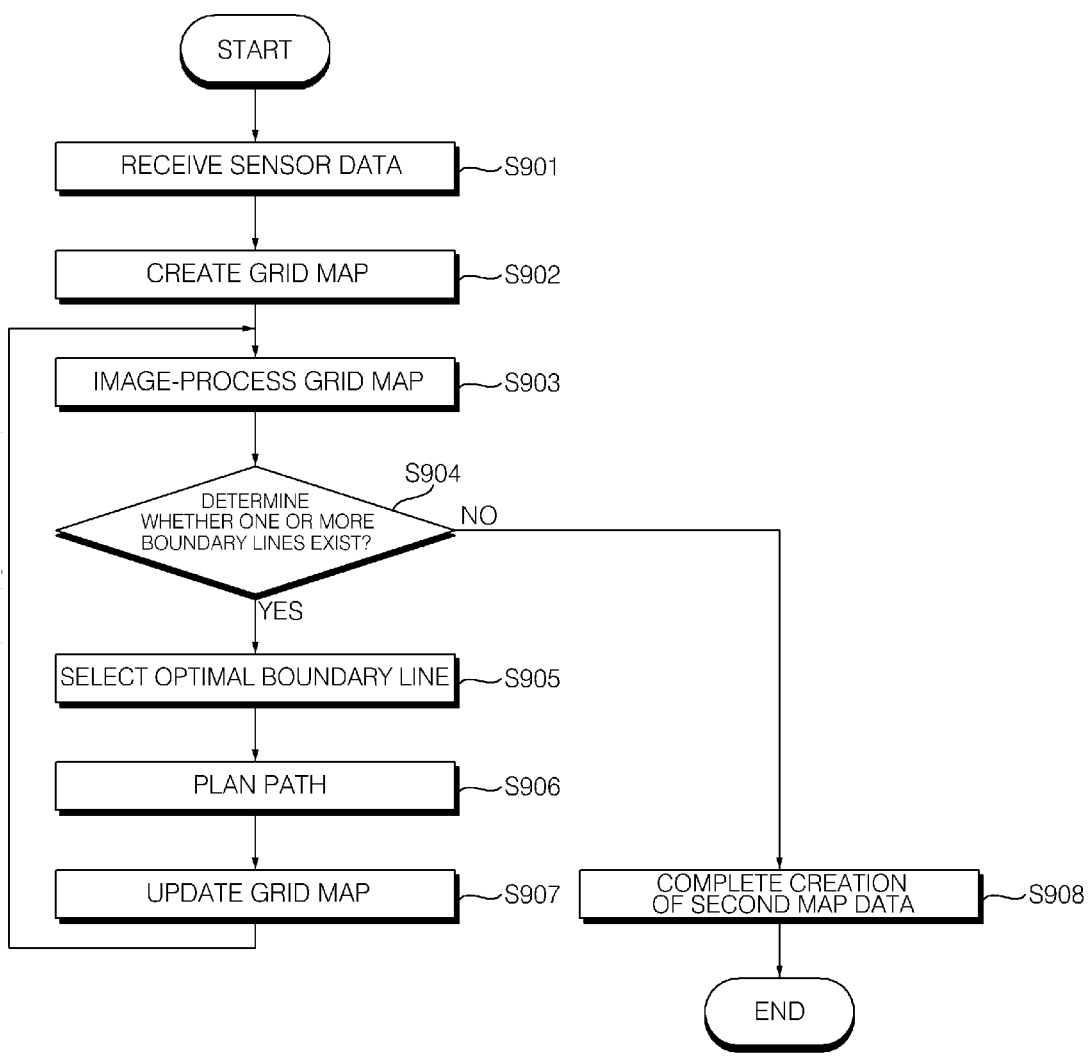
FIG. 9 is a flowchart referred to understanding of a method of creating a second map of a mobile robot according to an embodiment of the present disclosure.

FIG. 9 is a flowchart referred to understand a process of creating a second map of a mobile robot according to an embodiment of the present disclosure. Referring to FIG. 9, the mobile robot 100 may automatically create map through a step (S901) of receiving sensor data regarding a distance to an external object through a distance measurement sensor, a step (S902) of creating a cell-based grid map based on the sensor data, an image processing step (S903) of dividing regions in the grid map and creating a boundary line between the regions, a step (S904) of determining whether there is one or more boundary lines, a step (S905) of selecting an optimal boundary line if there are one or more boundary lines, a step (S906) of planning a path to the optimal boundary line, and a step (S907) of updating the grid map, while moving along the planned path. In the step (S904) of determining whether there are one or more boundary lines, if one or more boundary lines do not exist, the mobile robot 100 may complete the map creation (S908) and store the completed map in the storage unit 305.

The sensor data receiving step (S901) of FIG. 9 may include the step (S501) of receiving the LiDAR data of FIG. 5. The sensor data may include LiDAR data and node data created with the LiDAR data. The sensor data receiving step (S901) may be a process in which the controller 350 receives the LiDAR data sensed through the LiDAR sensor 175 among the distance measurement sensors. The LiDAR sensor 175 may output a laser and provide information such as a distance, a location, a direction, and a material of an object that reflects the laser, and may acquire geometry information of the traveling zone.

The LiDAR data according to an embodiment of the present disclosure may refer to information such as a distance, a location, and a direction of obstacles sensed by the LiDAR sensor 175. The grid map creating step (S902) of FIG. 9 may include a grid map creating step (S503) and a grid map updating step (S505) of FIG. 5. That is, the independent grid map creating step (S902) may include the grid map creating step (S503) and the grid map updating step (S505) in the map creating process in which a node-based map and a grid-based map are combined.

When the grid map creating step (S902) of FIG. 9 is completed, an updated grid map in which the grid map update step (S505) of FIG. 5 is completed may be created. The image processing step (S903) for the grid map may include a step (S903-1) of dividing regions of the grid map, a step (S903-2) of performing image processing on the divided regions by colors, and an image processing step (S903-3) of indicating a line segment between the first region and the third region. Details thereof may be referred to FIG. 10.

According to an embodiment of the present disclosure, through the image processing step (S903) for the grid map, the grid map may be divided into a first region of a searched empty space, a second region where a searched obstacle exists, and a third unsearched region, and the first region may be processed to white, the second region may be processed to gray, and the third region may be processed to black.

The controller 350 may perform image processing to indicate a line segment between the first region and the third region. The controller 350 may determine the image-processed line segment as a boundary line.

The step (S904) of determining whether one or more boundary lines exist may be a process of determining the number of boundary lines through the line segment. That is, the controller 350 may determine the number of image-processed line segments. If one or more boundary lines do not exist, the controller 350 may complete the map creation and store the map in the storage unit 305. That is, the second map data creation may be completed.

If one or more boundary lines exist, an optimal boundary line among the one or more boundary lines may be selected (S905). The optimal boundary line may be referred to as next best view (NBV). In the optimal boundary line selecting step (S905), a cost function may be used. The cost function may be expressed by R(f) and may be calculated by Equation 1 below.

$$R(f)=a*H*I(f)-(1-a)*N(f) \quad \text{[Equation 1]}$$

Referring to Equation 1, I(f) is information cost and is a function related to environmental information (hereinafter, first information) around a boundary that may be acquired by moving to any one boundary. I(f) may be calculated by a length of the boundary line and the number or ratio of cells in the third region. When the length l of the boundary line is long, it is likely to be a large space and the cost value may be large. If the number u of cells in the third region within a certain radius is large, the ratio of the unsearched region may be large and the cost value may be large.

That is, I(f) may be a function regarding environmental information for determining whether there is a need to preferentially search because the space around the one boundary line is large or the ratio of unsearched region is large, when moving to any one of boundary lines. I(f) may be a weight function for the length (l) of the boundary line and the number (u) of cells in the third region within a certain radius.

$$I(f)=\omega*l(f)+(1-\omega)*u(f) \quad \text{[Equation 2]}$$

N(f) is a navigation cost and is a function of distance information (second information) from the current location of the mobile robot 100 to the center point of any one boundary line. The value of N(f) may increase as the distance from the current location of the mobile robot 100 to the center point of the any one boundary line is shorter.

If the cost value increases as N(f) is larger, a map may be created from a point close to the location of the current mobile robot 100. From the user's point of view, it may be advantageous that N(f) is greater than a certain level. However, if N(f) is too large, there is a high possibility of searching for every corner even in a narrow space, so it may be calculated by weighting with I(f) for efficient map creation.

Variable "a" refers to a weight of I(f) and N(f). In other words, the cost function is a weight function for the first information and the second information, and the cost value may be determined by a weight function for the first information and the second information. The weight may be selected by a user's input signal.

The user may weight I(f) for fast map creation to a large spatial center and may weight N(f) for map creation of every corner to a close spatial center. This principle may be applied not only to the creation of the map but also to a cleaning process.

H is a hysteresis gain and refers to a gain depending on where a boundary line is located according to a sensing range. A sensing radius of the LiDAR sensor 175 may be 11 meters. If the boundary line is within the sensing range based on the current location of the mobile robot 100, H>1, and if the boundary line is outside the sensing range, H=1. H may allow to select a boundary line in a traveling direction of the robot, thereby preventing inefficient traveling of changing directions back and forth.

Figure 12A:
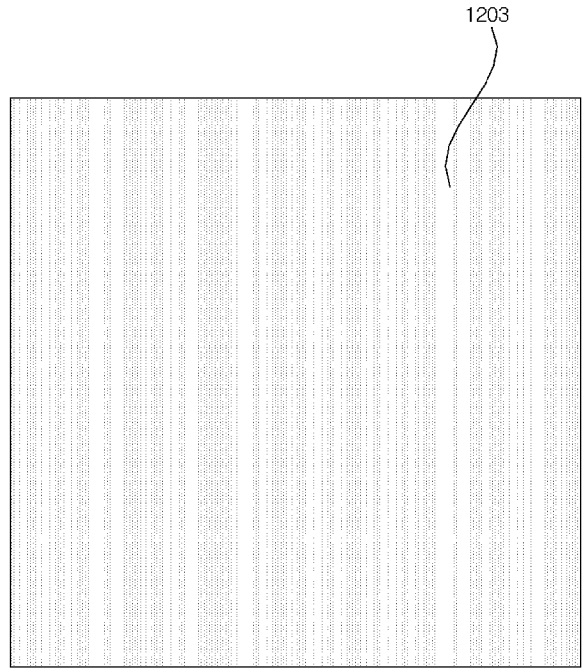
FIGS. 12A to 12F are views illustrating a process of creating second map data according to an embodiment of the present disclosure.
Figure 12B:
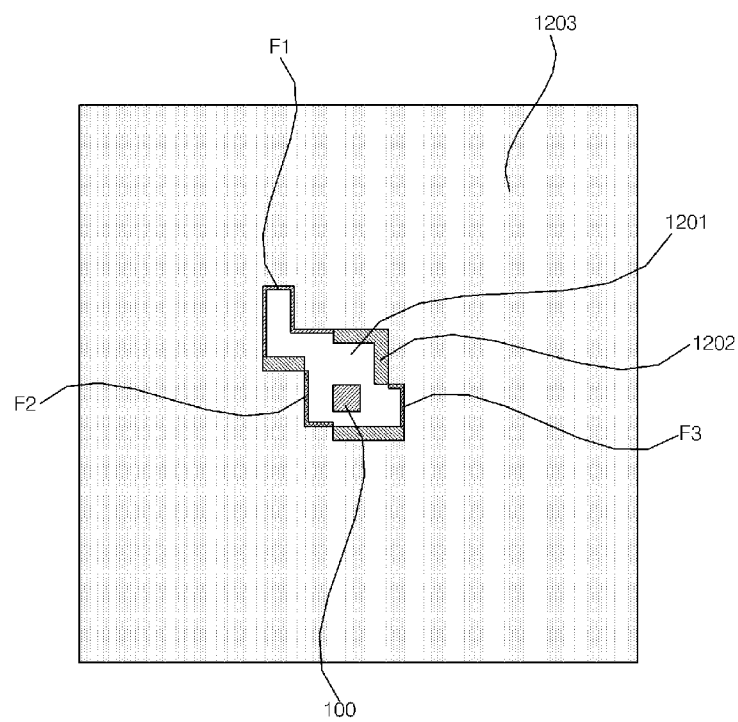
Figure 12C:
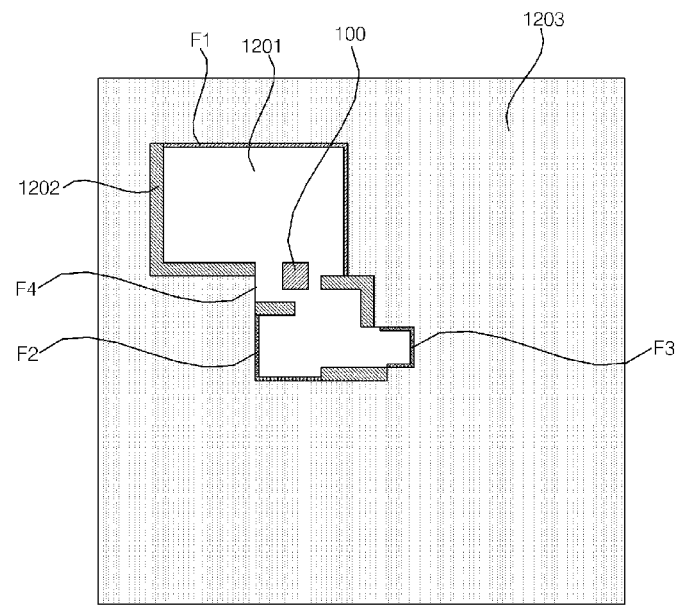

Referring to FIG. 12C, the mobile robot 100 may select one boundary line having the highest cost value among the plurality of boundary lines through the optimal boundary line selecting step S905. Although each of a first line segment, a second line segment, and a third line segment is not illustrated, the controller 350 may determine the first line segment, the second line segment, and the third line segment, respectively, as a first boundary line F1, a second boundary line F2, and a third boundary line F3.

A length of the first boundary line F1 may be the longest, and a length of the third boundary line F3 may be the shortest. The optimal boundary line may be selected as a first boundary line F1 having the largest cost value among the plurality of boundary lines through the cost function. This is because if the weight of the N(f) value is not large, the length of the first boundary line F1 is the longest and the 1(f) value is large.

The path planning step (S906) may be a process of planning a path to the optimal boundary line NBV. In a state where a center point of the optimal boundary line NBV is set, the path may refer to a path from the current location to the center point.

The center point of the optimal boundary line NBV may be a point that bisects the length of the boundary line. The controller 350 may set a point that bisects the length of the boundary line as a center point, and create a path from the current location of the mobile robot 100 to the center point. The path planning step (S906) may include a path creating step.

Figure 11:
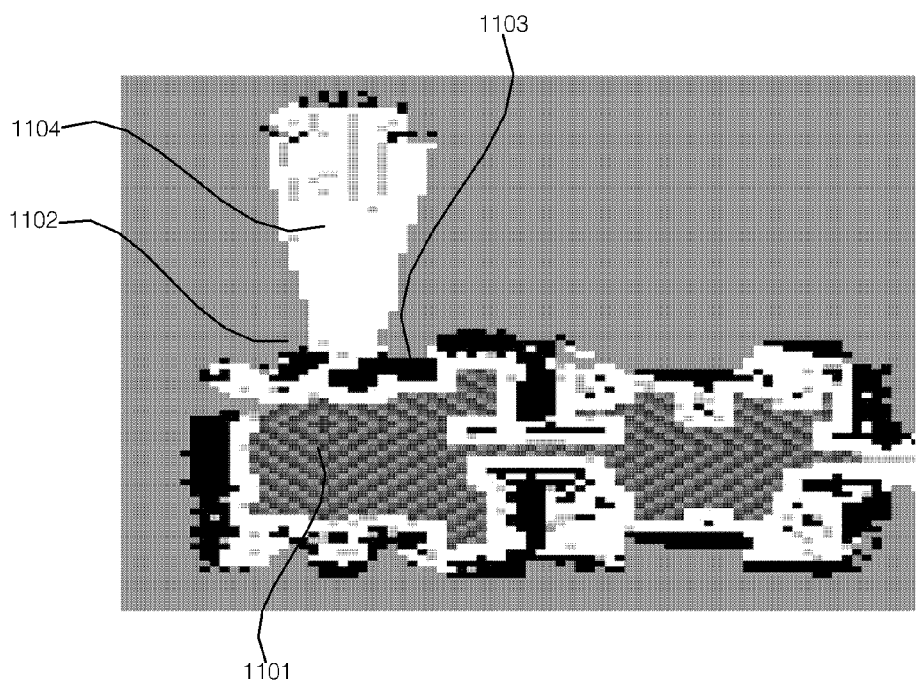
FIG. 11 is a view to help understand a grid wave creating step according to an embodiment of the present disclosure.

FIG. 11 is a view to help understand a grid wave creating step according to an embodiment of the present disclosure. Referring to FIG. 11, the step of creating a path may further include a wave creating step of creating a grid wave 1101 and preferentially checking whether there is a space in which the mobile robot 100 is to be located. For example, the grid wave 1101 may correspond to a type of audio or electromagnetic emission, and the mobile robot 100 may determine regions from when a reflection of the grid wave is received as an obstacle.

The controller 350 may determine a space where the grid wave does not reach as a space where the mobile robot 100 cannot be located, and create a path only within a space where the grid wave reaches. For example, as shown in FIG. 11, the wave may be cut off by obstacles 1102 and 1103 and a grid wave 1101 may not reach a first space 1104. In this case, path may not be created in the first space.

The controller 350 may determine the space where the grid wave 1101 does not reach as a space where the mobile robot 100 cannot be located, and may not perform the image processing step (S903-3) of indicating a line segment between the first region and the third region present in the space where the grid wave 1101 does not reach. That is, the controller 350 may not be able to determine a boundary line in the space where the grid wave 1101 does not reach.

The grid map updating step (S907) may be a step of updating the grid map, while moving along the created path. The mobile robot 100 may move along the planned path to the center point of the optimal boundary line NBV, but may move up to a point before a predetermined distance. For example, the mobile robot 100 may only move up to 1 meter before the center point of the optimal boundary line NBV.

In the case of creating the grid map, the LiDAR sensor 175 may have a sensing radius of 11 m. In the case of creating second map data, the LiDAR sensor 175 may have a sensing radius of 11 meters. Therefore, the operation in which the mobile robot 100 moves to the end of the center point of the optimal boundary line NBV may be an unnecessary operation. The mobile robot 100 may move from the center point of the optimal boundary line NBV to a point before a predetermined distance to reduce a moving time, thereby performing efficient map creation.

The mobile robot 100 may update the grid map, while moving along the path created through the path planning step (S906). That is, the mobile robot 100 may update the grid map based on the LiDAR data sensed while moving from the optimal boundary line NBV to a point before a predetermined distance.

The mobile robot 100 may repeat the process of re-imaging the updated grid map, determining a boundary line, and selecting an optimal boundary line to update the path plan and the map. If the mobile robot 100 determines that one or more boundary lines do not exist in the updated map, the mobile robot 100 may complete the map creation and store the updated map in the storage unit 305. That is, the mobile robot 100 may complete the creation of the second map data when one or more boundary lines do not exist (S908).

Figure 10:
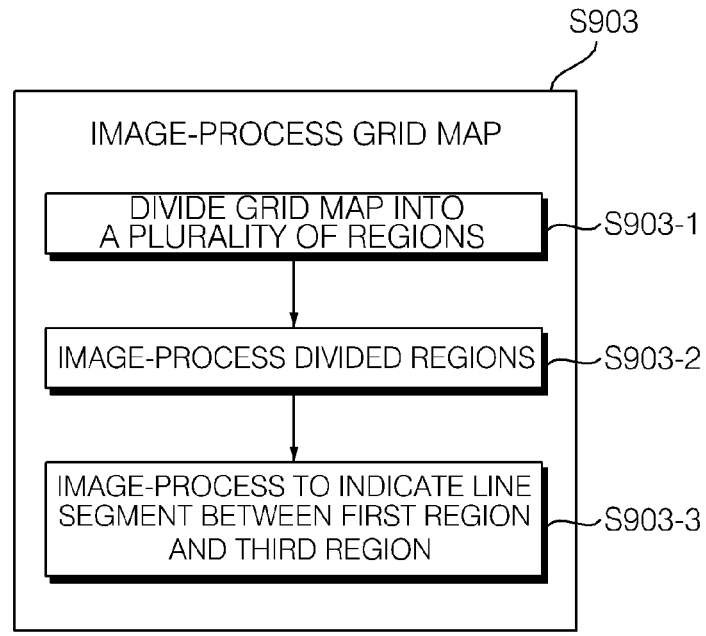
FIG. 10 is a view specifically illustrating an image processing step for a grid map according to an embodiment of the present disclosure.

FIG. 10 is a view specifically showing an image processing step for a grid map according to an embodiment of the present disclosure. Referring to FIG. 10, the image processing step (S903) for the grid map may include a step (S903-1) of dividing regions of the grid map, a step (S903-2) of image-processing the divided regions by colors, and a step (S903-3) of image-processing through a line segment between a first region and a third region.

The step (S903-1) of dividing the regions of the grid map may be a process of dividing the grid map created in the grid map creating step (S902) into a plurality of regions. The step (S903-1) of dividing the regions of the grid map may be a process of dividing the grid map updated in the grid map updating step (S505) of FIG. 5 into a plurality of regions.

The controller 350 may divide the grid map into a first region if a result sensed by the sensor unit 370 is an empty space, a second region if a result sensed by the sensor unit 370 is a space with an obstacle, and a third region if it is an unsearched space not sensed by the sensor unit 370. The regions may be more various. The step (S903-2) of image-processing the divided regions by colors may be a process of displaying the regions in different colors. The image processing may be to display colors in cells existing in each region. In this case, a color difference between the first region and the third region may be greater than a color difference between other regions.

Image processing through color may also include image processing through a difference in brightness. For example, each region may be distinguished through a gray scale. Referring to FIG. 12C, the first region 1201 may be displayed in white, the second region 1202 may be displayed in gray, and the third region 1203 may be displayed in black. A difference in brightness between the first region 1201 and the third region 1203 may be greater than a difference in brightness between other regions.

The step (S903-3) of image-processing through a line segment between the first region 1201 and the third region 1203 may be a process of drawing a line segment that separates between the first region 1201 and the third region 1203. The controller 350 may determine the image-processed line segment as a boundary line. That is, referring to FIG. 12C, boundary lines may include a first boundary line F1, a second boundary line F2, and a third boundary line F3.

The step (S903-3) of image-processing through the line segment may further include comparing the length between the first region and the third region and the width of the mobile robot 100. If it is determined that the length between the first region and the third region is shorter than the width of the mobile robot 100, the controller 350 may not perform image processing to display a line segment between the first region and the third region.

The controller 350 may perform image processing for extracting between the first region and the third region, which are longer than the width of the mobile robot 100, to display line segments. Accordingly, a map may be efficiently created by setting only a space in which the mobile robot 100 may move. The image processing step (S903-3) through the line segment may further include a wave creating step of creating a grid wave and determining whether there is a space for the mobile robot 100 to be located.

The controller 350 may determine a space where the grid wave does not reach as a space where the mobile robot 100 cannot be located, and may not perform image processing to display a line segment between the first region and the third region of the space where the grid wave does not reach. Accordingly, a map may be efficiently created, while only the space in which the moving robot. 100 may move is searched.

FIGS. 12A to 12F are views illustrating a process of creating second map data according to an embodiment of the present disclosure. In FIGS. 12A to 12F, a first region 1201 which is a searched empty space, a second region 1202 which is a space where a searched obstacle exists, and a third region 1203 which is an unsearched space may be changed according to the passage of time.

The first region 1201 may be displayed in white, the second region 1202 may be displayed in gray, and the third region 1203 may be displayed in black, and the controller 350 may determine boundary lines F1, F2, and F3 through the image-processed line segments between the first region 1201 and the third region 1203. FIG. 12A may show a step immediately before the mobile robot 100 starts searching. Since it is before starting to sense, only the black third region 1203 may exist.

FIG. 12B may show a step in which the mobile robot 100 starts searching. In the map data creating step (S506), a sensing radius of the LiDAR sensor may be 11 meters. The controller 350 may image-process the updated grid map to classify a white first region 1201, a gray second region 1202, and a black third region 1203.

In addition, the controller 350 may determine the first boundary line F1, the second boundary line F2, and the third boundary line F3 through the process of image processing the grid map. The optimal boundary line NBV may be a boundary line having the highest cost value. For example, the controller 350 may select the first boundary line F1 having the longest boundary line as an optimal boundary line. The optimal boundary line may vary depending on how a weight is set.

Next, the controller 350 may plan a path to the center point of the first boundary line F1. In this case, the controller 350 may preferentially determine whether there is a space where the mobile robot 100 may be located through the grid wave.

FIG. 12C may show a result of updating a grid map based on sensed data while the mobile robot 100 moves along the planned path. The controller 350 may image-process the updated grid map and classify it into a white first region 1201, a gray second region 1202, and a black third region 1203.

In addition, the controller 350 may determine the first boundary line F1, the second boundary line F2, and the third boundary line F3 through the process of image processing the grid map. In this case, a fourth boundary F4 narrower than the width of the mobile robot 100 may exist between the first region 1201 and the third region 120.

The controller 350 may omit the image processing step (S903-3) of displaying the line segment at the fourth boundary F4. A line segment is not displayed on the fourth boundary F4, and the controller 350 may not determine the fourth boundary F4 as a boundary line.

The optimal boundary line NBV may be a boundary line having the highest cost value. For example, the controller 350 may select the first boundary line F1 having the longest boundary line as an optimal boundary line. Next, the controller 350 may plan a path to the center point of the first boundary line F1. In this case, the controller 350 may determine whether there is a space where the mobile robot 100 may be located through the grid wave.

Figure 12D:
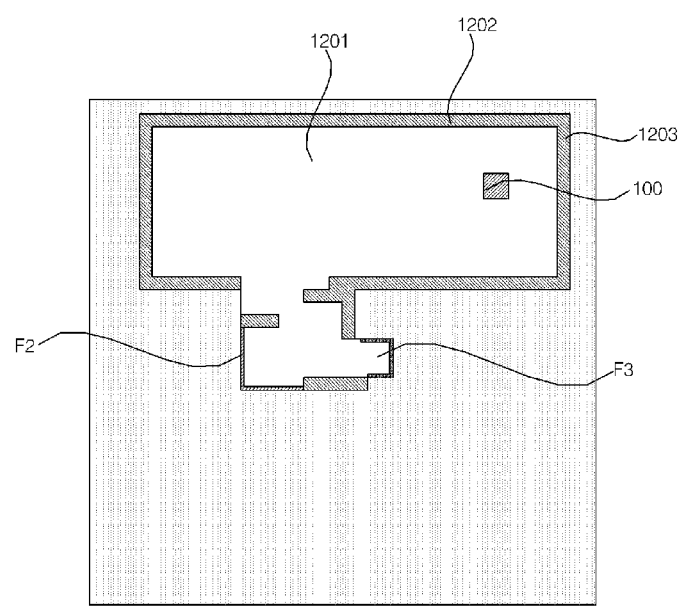

FIG. 12D may show a result of updating a grid map based on sensed data while the mobile robot 100 moves along the planned path. The controller 350 may image-process the updated grid map to classify it into a white first region 1201, a gray second region 1202, and a black third region 1203.

In addition, the controller 350 may determine the second boundary line F2 and the third boundary line F3 through the process of image processing the grid map. The optimal boundary line NBV may be a boundary line having the highest cost value. For example, the controller 350 may select the second boundary line F2 having the longest boundary line as an optimal boundary line.

A sensing radius of the rider sensor may be 11 m. Therefore, LiDAR data may be collected up to the location of the third boundary line F3, while moving through the path plan to the center point of the second boundary line F2. The mobile robot 100 may efficiently create a map by creating a grid map without moving to the location of the third boundary line F3 through the LiDAR sensor. Next, the controller 350 may plan a path to the center point of the second boundary line F2. In this case, the controller 350 may preferentially determine whether there is a space where the mobile robot 100 may be located through the grid wave.

Figure 12E:
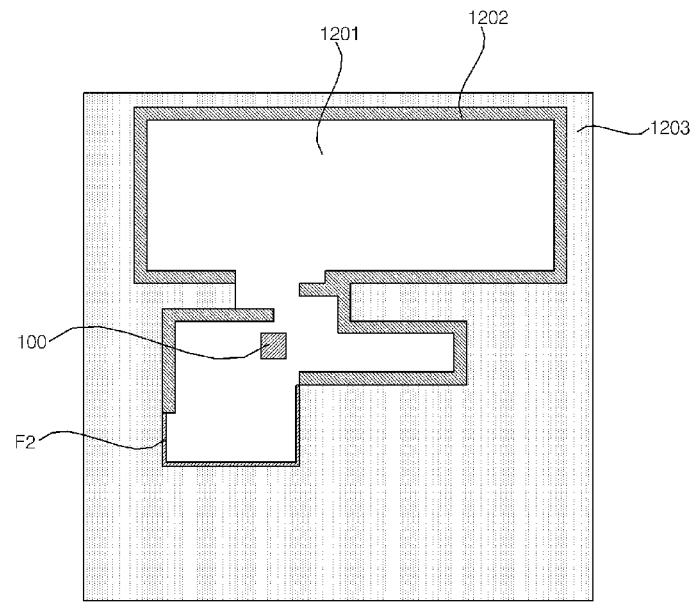

FIG. 12E may show a result of updating a grid map based on sensed data while the mobile robot 100 moves along a planned path. The controller 350 may image-process the updated grid map to classify it into a white first region 1201, a gray second region 1202, and a black third region 1203.

In addition, the controller 350 may determine the second boundary line F2 through the process of image processing the grid map. Since the number of boundary lines is one, the boundary line may be an optimal boundary line NBV. Next, the controller 350 may plane a path to the center point of the second boundary line F2. In this case, the controller 350 may preferentially determine whether there is a space where the mobile robot 100 may be located through the grid wave.

Figure 12F:
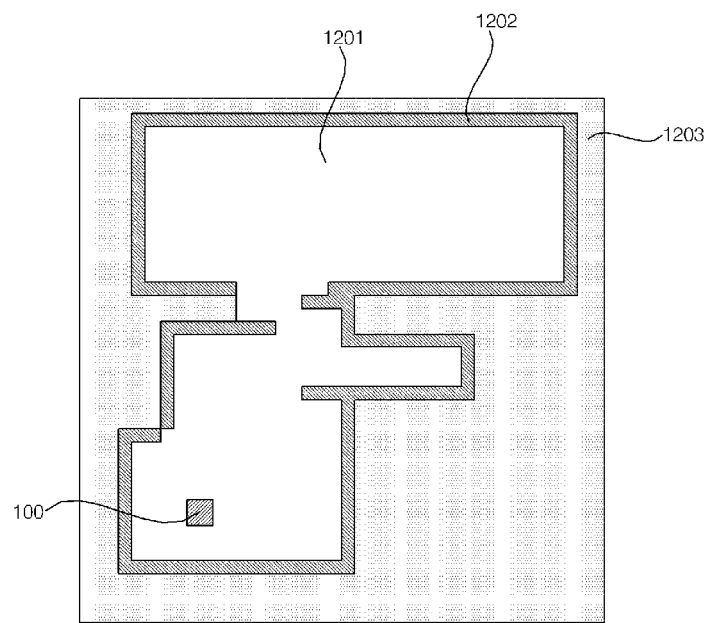

FIG. 12F shows a step of completing creation of a grid map based on data sensed while the mobile robot 100 moves along a planned path. The controller 350 may image-process the updated grid map to classify it into a white first region 1201, a gray second region 1202, and a black third region 1203. In this case, a boundary line between the first region 1201 and the third region 1203 may no longer exist.

The controller 350 may complete the creation of the second map data and store the second map data in the storage unit 305. The second map data, which has been created, may include an image in which the second region 1202 forms a closed loop. The created second map data may include an image in which the fourth boundary F4 and the second region 1202, which omit the image processing step S903-3 through the line segment, form a closed loop.

The mobile robot according to the present disclosure is not limited to the configuration and method of the embodiments described above, and all or some of the embodiments may be selectively combined to be configured so that various modifications may be made. Similarly, the operations are depicted in a particular order in the drawings, but this depiction should not be understood as requiring that the operations be performed in the particular order shown or in a sequential order, or that all illustrated operations be performed, in order to achieve desirable results. In a particular case, multitasking and parallel processing may be advantageous.

The control method of a mobile robot according to embodiments of the present disclosure may be implemented as codes that can be read by a processor in a recording medium that can be read by the processor. The processor-readable recording medium may include any type of recording devices in which data that can be read by the processor is stored. The processor-readable recording medium also includes implementations in the form of carrier waves, e.g., transmission via the Internet. The processor-readable recording medium may be distributed over network-connected computer systems so that processor-readable codes may be stored and executed in a distributed fashion.

Specific embodiments have been described. However, the present disclosure is not limited to the specific embodiments and various modifications may be made without departing from the scope of the present disclosure claimed in the claims, and such modifications should not be individually understood from technical concepts or prospects of the present disclosure.

According to the present disclosure, one or more of the following aspects may be achieved. First, the center of a passage is determined through configuration of creation of first map data and the mobile robot travels by utilizing a real-time sensor, thereby completing map creation safely and rapidly. Second, shortcomings when first map data and second map data are separately created may be overcome through the configuration of updating a grid map based on the first map data. Third, first map data is preferentially created and second map data is subsequently created, thereby creating map data on every environment without an environmental restriction. Meanwhile, the aspects of the present disclosure are not limited to the above-mentioned aspects, and other aspects not mentioned will be clearly understood by those skilled in the art from the description of the claims.

The present disclosure provides a mobile robot capable of creating nodes in real time, while on a move, in creating a topological map, thereby accurately setting a connection relationship between the nodes, and a control method thereof. The present disclosure also provides a technique of quickly finding a boundary between a searched empty region and an unsearched region, regardless of complexity of a grid map, through image processing of the map.

The present disclosure also provides a technique of combining creation of a node map using data on a node and creation of a grid map using data on a cell, thereby creating final map data merging advantages of the node map and advantages of the grid map. The present disclosure also provides a technique of prioritizing creation of a node-based map and subsequently creating a cell-based map based on the created map on the assumption of moving in designated directions (four or eight directions), thereby creating map data regarding every environment.

In an aspect, a mobile robot is provided. The mobile robot includes: a traveling unit configured to move a main body;

a light detection and ranging (LiDAR) sensor configured to acquire external geometry information of the main body; and a controller configured to create node data based on LiDAR data sensed by the LiDAR sensor, to create first map data based on the node data, to create a grid map based on the first map data, and to image-process the grid map to create second map data.

The mobile robot may include a controller configured to create second map data based on a grid map at a time when creation of the first map data terminates. The mobile robot may include a controller configured to determine whether each of a plurality of preset movement directions is open based on the external geometry information acquired through a LiDAR sensor and to create a new node according to a determination result to create first map data.

In another aspect, a mobile robot is provided. The mobile robot includes: a controller configured to determine whether there is at least one open movement direction among a plurality of preset movement directions based on LiDAR data and node data, to create new node in node data according to a preset condition if there is at least one open movement direction, to determine one of open movement directions as a traveling direction in which a main body moves, to determine whether at least one of nodes requires updating if there is no open movement direction, to control a traveling unit to move the mobile robot to one of nodes requiring updating if there are nodes that require updating, and to complete creation of first map data including at least one node based on the node data if there is no node that requires updating.

In another aspect, a mobile robot is provided. The mobile robot includes: a controller configured to divide a grid map into a first region, a second region, and a third region, to perform image processing to create a boundary line between the first region and the third region, to determine a boundary line, to select an optimal boundary line if there are one or more boundary lines, to perform a path plan to the optimal boundary line, and to update the grid map, while moving along a created path, to complete creation of second map data.

In another aspect, a mobile robot is provided. The mobile robot includes: a controller configured to cause colors of each region to be different such that a difference between the color of the first region and the color of the third region is largest, and to create a boundary line through image processing to indicate a line segment between the first region and the third region.

In another aspect, a mobile robot is provided. The mobile robot includes: a controller configured to complete creation of second map data and to store final map data if there is no more boundary line on an updated grid map. In another aspect, a mobile robot is provided. The mobile robot may generate a map robust to a change in an environment and accurately recognize a location on the map by complementarily using heterogeneous data acquired by utilizing a heterogeneous sensor together with a LiDAR sensor.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile robot comprising:
a wheel configured to move a main body of the mobile robot;
a LIDAR sensor configured to collect sensor data regarding a distance from the main body to at least one object in a region outside the main body; and
a controller configured to:
create node data associated with a plurality of nodes corresponding to locations in the regions where the sensor data is collected by the LIDAR sensor, wherein the node data for one of the nodes includes a coordinate value for a location of the node and a data value for each of a plurality of movement directions,
create a map of the region based on the sensor data and the node data,
create first map data identifying a path through at least one of the nodes based on the node data,
determine whether at least one open movement direction is present among the plurality of movement directions based on the node data for each node,
generate a new node to the node data if the at least one open movement direction is present among the plurality of movement directions,
determine one of the open movement directions as a traveling direction in which the main body of the moving robot moves,
determine, when the main body returns to one of the nodes that the main body has already passed, that the node has the open movement direction along which the main body has not previously traveled based on the node data, and determine the node needs to be updated,
control the wheel such that the mobile robot moves to the nodes to be updated, wherein the data values for the one of the nodes to be updated is set to a first particular data value indicating the open movement direction,
create the first map data identifying a path through including at least one of the nodes based on the node data of the nodes is to be updated,
update the map based on the first map data to include an indication of the path, and
perform image-processing to the updated map as a grid map to create second map data to identify another location in the region that is not represented in the node data for collecting additional sensor data by the LIDAR sensor,
wherein:
the first map data based on the node data and the second map data based on the grid map are independently generated,
the first map data based on the node data and the second map data based on the grid map are combined, and
the first map data is based on the node data collected by the LIDAR sensor for moving along a center of a movement passage, and wherein the plurality of movement directions are preset and the data value regarding each of the plurality of preset movement directions is set to one of
the first particular data value indicating that the preset movement direction is an open movement direction in which the mobile robot is able to travel from the node,
a second particular data value indicating that the mobile robot is unable to travel in the preset movement direction from the node, or
a third particular data value indicating that another one of the nodes is positioned in the preset movement direction from the node.

2. The mobile robot of claim 1, wherein the controller creates the map within a sensing range of the LIDAR sensor based on the coordinate value for the node location while creating the node data.

3. The mobile robot of claim 2, further comprising:
a memory configured to store the node data, the first map data, the map, and the second map data.

4. The mobile robot of claim 3, further comprising:
at least one camera to acquire an external image of the main body,
wherein the controller extracts a feature from the external image, maps the feature to the second map data, and determines a location of the mobile robot based on the feature mapped to the second map data.

5. The mobile robot of claim 3, wherein the controller:
determines a first subset of the plurality of movement directions in which the mobile robot is able to travel,
determines a second subset of the plurality of movement directions in which the mobile robot has already traveled, and
determines the traveling direction as one of the plurality of movement directions, that is included in the first subset and not included in the second subset.

6. The mobile robot of claim 5, wherein the controller
determines whether the traveling direction corresponds to an open movement direction, and
generates the new node if the traveling direction does not correspond to the open movement direction.

7. The mobile robot of claim 6, wherein the controller
determines whether only the traveling direction, among the plurality of movement directions, corresponds to the open movement direction,
controls the wheel such that the mobile robot moves in the traveling direction, without creating the new node, if only the traveling direction is the open movement direction, and
creates the new node if at least one of the plurality of movement directions that differs from the traveling direction corresponds to the open movement direction.

8. The mobile robot of claim 7, wherein
the controller updates data values of each of the nodes included in the node data for the plurality of movement directions when the new node is created.

9. The mobile robot of claim 3, wherein the controller
divides the map created based on the sensor data into a first region which is an empty space according to the LIDAR sensor, a second region which is a space in which an obstacle is present according to the LIDAR sensor, and a third region which is not sensed by the LIDAR sensor,
performs image-processing to generate a boundary line between the first region and the third region,
selects an optimal boundary line from one or more boundary lines, performs path planning up to the optimal boundary line, and updates the map, while moving along the path, to create the second map data.

10. The mobile robot of claim 9, wherein the controller completes the creation of the second map data and stores the second map data in the memory when no boundary line is present in the second map data.

11. The mobile robot of claim 10, wherein the controller, when performing the image processing, assigns colors of each region such that a difference between the color of the first region and the color of the third region is greater than respective differences between the color of the second region and colors of the first and the third regions, and identifies a line segment between the first region and the third region, and determines the line segment as the boundary line.

12. The mobile robot of claim 11, wherein the controller compares a length between the first region and the third region and a width of the mobile robot, and selects the line segment when the length between the first region and the third region is greater than the width of the mobile robot.

13. The mobile robot of claim 9, wherein the optimal boundary line is one of the one or more boundary lines having a largest a cost value, among cost values for the of the one or more boundary line, and the cost values are calculated based on first information on an environment acquired at one of the one or more boundary lines and second information which is information on a distance to the boundary line.

14. The mobile robot of claim 13, wherein the cost values are determined based on a weight function regarding the first information and the second information.

15. The mobile robot of claim 9, wherein the controller sets a center point of the optimal boundary line and creates a path from a current location to the center point to perform the path planning.

16. The mobile robot of claim 15, wherein the controller controls the mobile robot to create a grid wave, and creates the path within a space in which the grid wave reaches.

* * * * *